(12) United States Patent
Tomita

(10) Patent No.: US 8,125,664 B2
(45) Date of Patent: Feb. 28, 2012

(54) PULL PRINT SUPPORTING IMAGE FORMING SYSTEM, IMAGE FORMING APPARATUS AND IMAGE FORMING METHOD

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 998 days.

(21) Appl. No.: 12/029,167

(22) Filed: Feb. 11, 2008

(65) Prior Publication Data

US 2009/0059273 A1 Mar. 5, 2009

(30) Foreign Application Priority Data

Aug. 28, 2007 (JP) ................................. 2007-221151

(51) Int. Cl.
*G06F 3/12* (2006.01)
*G06K 15/00* (2006.01)

(52) U.S. Cl. ...... 358/1.14; 358/1.9; 358/1.13; 358/1.15; 358/1.18

(58) Field of Classification Search .................. 358/1.9, 358/1.13–1.18
See application file for complete search history.

(56) References Cited

U.S. PATENT DOCUMENTS

| | | | | |
|---|---|---|---|---|
| 7,809,807 B2 * | 10/2010 | Tominaga | ................ | 709/220 |
| 2001/0029551 A1 | 10/2001 | Higuchi | | |
| 2003/0033368 A1 | 2/2003 | Tominaga | | |
| 2005/0068564 A1 | 3/2005 | Ferlitsch | | |
| 2006/0012835 A1* | 1/2006 | Shimizu | ................ | 358/449 |
| 2006/0164677 A1* | 7/2006 | Ahn | ................ | 358/1.15 |
| 2006/0224939 A1 | 10/2006 | Namikata | | |
| 2008/0309961 A1 | 12/2008 | Aichi et al. | | |
| 2009/0059274 A1 | 3/2009 | Tomita | | |
| 2009/0059275 A1 | 3/2009 | Tomita | | |

FOREIGN PATENT DOCUMENTS

| | | |
|---|---|---|
| JP | 10-124356 | 5/1998 |
| JP | 10-254662 A | 9/1998 |
| JP | 11-234436 | 8/1999 |
| JP | 2000-112687 A | 4/2000 |
| JP | 2001-216242 | 8/2001 |
| JP | 2001-249781 | 9/2001 |
| JP | 2002-049476 | 2/2002 |

(Continued)

OTHER PUBLICATIONS

Office Action from Japanese Patent Office issued in related Japanese Patent Application No. 2009-172022 dated Dec. 21, 2010, and an English translation thereof.

(Continued)

*Primary Examiner* — James A Thompson
*Assistant Examiner* — Jonathan Beckley
(74) *Attorney, Agent, or Firm* — Buchanan Ingersoll & Rooney PC

(57) ABSTRACT

When a user applies a pull print request by operating an operation panel unit of an image forming apparatus MFP, a server SRV transmits a list of print data stored therein and setting information of each print data to the image forming apparatus MFP. The image forming apparatus MFP receives the setting information of each print data, and based on device information of itself, calculates compatibility as a degree representing to which extent the request of the setting information of each print data can be satisfied, and displays the print list and the compatibility corresponding to each print data in the list, to the user.

18 Claims, 20 Drawing Sheets

| | 532 | 534 | 536 | 538 |
|---|---|---|---|---|
| SET ITEM | | EXECUTABILITY | WEIGHT COEFFICIENT | SATISFACTION LEVEL |
| DOUBLE SIDED PRINT | | 1 | 9 | 9 |
| NUMBER OF COPIES | | 1 | 7 | 7 |
| SORT | | 1 | 8 | 8 |
| Nin1 | | 1 | 10 | 10 |
| STAPLE | | 0 | 2 | 0 |
| PUNCH | | 0 | 2 | 0 |
| | | | 38 | 34 |

COMPATIBILITY 34/38=89%

FOREIGN PATENT DOCUMENTS

| | | |
|---|---|---|
| JP | 2002-132464 A | 5/2002 |
| JP | 2003-046761 A | 2/2003 |
| JP | 2003-050689 | 2/2003 |
| JP | 2004-072247 | 3/2004 |
| JP | 2004-074473 | 3/2004 |
| JP | 2004-193639 A | 7/2004 |
| JP | 2004-220354 A | 8/2004 |
| JP | 2004-234326 | 8/2004 |
| JP | 2004-287763 | 10/2004 |
| JP | 2005-056294 | 3/2005 |
| JP | 2005-173658 | 6/2005 |
| JP | 2006-031465 | 2/2006 |
| JP | 2006-067368 A | 3/2006 |
| JP | 2006-092373 | 4/2006 |
| JP | 2006-099714 | 4/2006 |
| JP | 2006-133877 | 5/2006 |
| JP | 2006-197158 | 7/2006 |
| JP | 2006-252300 A | 9/2006 |
| JP | 2006-287745 | 10/2006 |
| JP | 2006-350497 | 12/2006 |
| JP | 2007-030354 | 2/2007 |

OTHER PUBLICATIONS

Office Action from Japanese Patent Office issued in related Japanese Patent Application No. 2007-221153 dated Jun. 23, 2009, and an English translation thereof.

Office Action from Japanese Patent Office issued in related Japanese Patent Application No. 2007-221152 dated Jun. 23, 2009, and an English translation thereof.

Notice of Grounds of Rejection in JP 2007-221151 dated Jun. 23, 2009, and an English Translation thereof.

Decision to Grant and English Language translation, mailed Apr. 19, 2011, in JP Appln No. 2009-172022, which corresponds to related U.S. Appl. No. 12/029,237, 6 pages.

Official Action dated Apr. 20, 2011, issued by the U.S. Patent and Trademark Office in related U.S. Appl. No. 12/029,188.

Official Action dated Apr. 20, 2011, issued by the U.S. Patent and Trademark Office in related U.S. Appl. No. 12/029,237.

Decision to Grant and English-language translation, mailed Apr. 19, 2011 in Corresponding JP Appln No. 2009-172022, 6 pages.

Office Action dated Nov. 23, 2011, issued by the U.S. Patent and Trademark Office in related U.S. Appl. No. 12/029,237, 18 pages.

* cited by examiner

```
%-12345X@PJL
    @PJL SET RESOLUTION = 600  — 331
    @PJL SET QTY = 2            — 332
    @PJL SET DUPLEX = ON        — 333
    @PJL SET BINDING = LEFT     — 334
    @PJL SET FINISH = NONE      — 335
    @PJL SET PUNCH = LEFT       — 336
    @PJL SET ENTER LANGUAGE = PCL — 337
332 —[PDL DATA FOR DOCUMENTS]
    %-12345X
```
330

| JOB ID | DOCUMENT |
|---|---|
| 132 | DOCUMENT1.doc |
| 133 | DOCUMENT2.doc |
| 134 | DOCUMENT3.doc |
| 135 | DOCUMENT4.doc |
| 136 | DOCUMENT5.doc |
| ⋮ | ⋮ |
| | |

| IMAGE FORMING APPARATUS | IP ADDRESS | TYPE |
|---|---|---|
| MFP1 | 192.168.10.1 | TYPE a |
| MFP2 | 192.168.10.2 | TYPE b |
| MFP3 | 192.168.10.3 | TYPE b |
| MFP4 | 192.168.10.4 | TYPE a |
| MFP5 | 192.168.10.5 | TYPE c |
| ⋮ | ⋮ | ⋮ |
| | | |

| FUNCTION | STATE OF SUPPORT |
|---|---|
| DOUBLE SIDED PRINT | Y |
| Nin1 PRINT | Y |
| SORT OUTPUT | Y |
| GROUP OUTPUT | Y |
| FACE UP OUTPUT | Y |
| STAPLE | N |
| PUNCH | N |

| SET ITEM | WEIGHT COEFFICIENT | |
|---|---|---|
| DOUBLE SIDED PRINT | 9 | ⎫ |
| NUMBER OF COPIES | 7 | |
| SORT | 8 | ⎬ 560 |
| Nin1 | 10 | |
| FACE UP | 6 | ⎭ |
| STAPLE | 2 | ⎱ 562 |
| PUNCH | 2 | ⎰ |

FIG.16

| | 532 | 534 | 536 | 538 |
|---|---|---|---|---|
| SET ITEM | | EXECUTABILITY | WEIGHT COEFFICIENT | SATISFACTION LEVEL |
| DOUBLE SIDED PRINT | | 1 | 9 | 9 |
| NUMBER OF COPIES | | 1 | 7 | 7 |
| SORT | | 1 | 8 | 8 |
| Nin1 | | 1 | 10 | 10 |
| STAPLE | | 0 | 2 | 0 |
| PUNCH | | 0 | 2 | 0 |
| | | | 38 | 34 |

COMPATIBILITY 34/38=89%

FIG.21 424

| FUNCTION | MFP1 | MFP2 | MFP3 | ~ | MFPn |
|---|---|---|---|---|---|
| DOUBLE SIDED PRINT | Y | Y | N | | Y |
| Nin1 PRINT | Y | Y | N | | Y |
| SORT OUTPUT | Y | Y | N | | Y |
| GROUP OUTPUT | Y | Y | Y | | Y |
| FACE UP OUTPUT | Y | Y | N | | Y |
| STAPLE | N | Y | N | | N |
| PUNCH | N | Y | N | | N |

FIG.22 422

| JOB ID | IMAGE FORMING APPARATUS | COMPATIBILITY | |
|---|---|---|---|
| 132 | MFP1 | 76 | ⎫ |
| 132 | MFP2 | 43 | ⎬ ONE PRINT DATA |
| 132 | MFP3 | 100 | ⎭ |
| 133 | MFP1 | 100 | |
| 133 | MFP2 | 44 | |
| : | : | : | |
| | | | |

PULL PRINT SUPPORTING IMAGE FORMING SYSTEM, IMAGE FORMING APPARATUS AND IMAGE FORMING METHOD

This application is based on Japanese Patent Application No. 2007-221151 filed with the Japan Patent Office on Aug. 28, 2007, the entire content of which is hereby incorporated by reference.

BACKGROUND OF THE INVENTION

1. Field of the Invention

The present invention relates to an image forming system, an image forming apparatus and an image forming method that support a so-called pull print function and, more specifically, to a technique for lessening machine dependency of print data.

2. Description of the Related Art

Conventionally, in a configuration for forming an image (typically, printing an image on paper medium) of a document or the like, generated by an information processing apparatus such as a personal computer, by an image forming apparatus such as a printer, the information processing apparatus and the image forming apparatus are connected to each other through a network and print data is directly transmitted from the information processing apparatus to the image forming apparatus. In such a configuration, the information processing apparatus and the image forming apparatus are connected in one-to-one correspondence.

As another approach, a so-called client-server type configuration is also available. In the client-server configuration, print data transmitted from a plurality of information processing apparatuses are once collected to a server, generally referred to as a print server. The print data (or print jobs) collected by the print server are transmitted to the image forming apparatus in a prescribed order. In this configuration, a plurality of information processing apparatuses share one image forming apparatus, by the server.

Recently, a scheme referred to as "pull print" or "ubiquitous print" has been proposed, which is an improvement over the client-server configuration. In the pull print supporting configuration, a server collects print data generated by any of the information processing apparatuses, and any of the image forming apparatuses selectively obtains print data collected in the server and forms an image of obtained print data. As an example of such pull print supporting configuration, Japanese Laid-Open Patent Publication No. 2004-220354 discloses a network printing system that allows a user to directly and plainly specify an output destination printer. The network printing system includes one or a plurality of client terminals, a print server and one or a plurality of printers, connected by a network.

In such a pull print supporting configuration, it is possible to form an image of an arbitrary print data by an arbitrary image forming apparatus. Therefore, when an image forming apparatus is busy with processing, destination can easily be changed to another image processing apparatus to finish the process.

Image forming apparatuses of late allow installation of various and many functions, and by such functions, various print settings may be made when the print data is generated by the information processing apparatus. The print setting designated on the side of information processing apparatus is added as setting information to the print data and transmitted to the server.

On the other hand, among the plurality of image forming apparatuses, there may be one not supporting most of the above-described functions. Therefore, when print data, prepared on the assumption that various and many functions are available, were processed by an image forming apparatus having limited functions only, the resulting output would be unsatisfactory. If the output destination of the print data is limited to only the image forming apparatus or apparatuses fully equipped with the necessary functions, the advantage of pull print type configuration that the print data can be processed by any of the image forming apparatuses cannot fully be enjoyed.

In this connection, assume that an image forming apparatus is equipped with most of the functions except for some functions of relatively low priority. The resulting output from such an image forming apparatus may be satisfactory to some users. In the prior art pull print type configuration, however, it has been impossible for the user to know in advance to which extent the print data request can be satisfied by each image forming apparatus. Therefore, it has been difficult for the user to easily determine which image forming apparatus is to be used for processing the print data.

SUMMARY OF THE INVENTION

The present invention was made to solve the above-described problem, and its object is to provide an image forming system, an image forming apparatus and an image forming method that allow the user to appropriately select an image forming apparatus to be used to form an image of print data that may contain request dependent on a specific function.

According to an aspect, the present invention provides an image forming system, including: at least one information processing apparatus capable of transmitting print data including setting information related to image formation; a server receiving the print data from the information processing apparatus; and at least one image forming apparatus capable of data communication with the server. The server includes a data storage unit storing the print data from the information processing apparatus, a setting information transmitting unit responsive to a list request from the information processing apparatus, for transmitting a list of the print data stored in the data storage unit and the setting information included in the print data to the image forming apparatus, and a print data transmitting unit responsive to a data request from the image forming apparatus, for transmitting a specific print data stored in the data storage unit to the image forming apparatus. Each image forming apparatus includes a list requesting unit transmitting the list request to the server in accordance with a user operation, a compatibility calculating unit receiving the setting information from the server and calculating compatibility as a degree representing to which extent the request of setting information can be satisfied, based on predetermined device information, a display unit displaying the list of print data from the server and the compatibility corresponding to the print data, a data requesting unit transmitting the data request for specifying selected print data to the server in accordance with a user operation, and a processing unit for performing an image forming process based on the print data from the server.

In this aspect, in response to a list request from the image forming apparatus, the server transmits the setting information included in the print data together with the print data list, to the image forming apparatus. Then, the image forming apparatus calculates, based on predetermined device information, compatibility of the setting information with the request, and indicates to the user the calculated compatibility together with the print data list. Therefore, it becomes possible for the user to select the print data as the object of image formation while making reference to the compatibility of the image forming apparatus of interest.

Preferably, the image forming apparatus is configured to selectively support a plurality of functions; the setting information includes setting of a process that depends on any of the plurality of functions; the device information includes a state information of support of the plurality of functions in the image forming apparatus, and the compatibility calculating unit calculates the compatibility based on the supported functions among functions necessary for executing the process designated in the setting information and on the weight corresponding to each function.

More preferably, the plurality of functions include a function related to a process during image formation and a function related to a process after image formation, and the weight corresponding to the function related to the process during image formation is different from the weight corresponding to the function related to the process after image formation.

Preferably, the display unit displays the print data satisfying all requests in the setting information in a manner different from other print data.

Preferably, the setting information includes setting of at least one of double-sided printing, reduced printing, sort output, group output, stapling and punching.

According to another aspect, the present invention provides an image forming system, including, at least one information processing apparatus capable of transmitting print data including setting information related to image formation; a server receiving the print data from the information processing apparatus; and at least one image forming apparatus capable of data communication with the server. The server includes a data storage unit storing the print data from the information processing apparatus, a device information storage unit storing in advance device information of each of the at least one image forming apparatus, a compatibility calculating unit for calculating, for each of the at least one image forming apparatus, compatibility as a degree representing to which extent the request of setting information can be satisfied, based on the device information of each of the at least one image forming apparatus, a compatibility transmitting unit responsive to a list request from the image forming apparatus, for transmitting the compatibility of each of the at least one image forming apparatus corresponding to the print data together with a list of the print data stored in the storage unit, to the image forming apparatus, and a print data transmitting unit responsive to a data request from the image forming apparatus, for transmitting a specific print data stored in the storage unit to the image forming apparatus. Each image forming apparatus includes a list requesting unit transmitting the list request to the server in accordance with a user operation, a display unit displaying the list of print data from the server and a representative value of the compatibility for each of the at least one image forming apparatus corresponding to the print data, a data requesting unit transmitting the data request for specifying a selected print data to the server in accordance with a user operation, and a processing unit for performing an image forming process based on the print data from the server.

In this aspect, receiving the print data from the information processing apparatus, the sever apparatus calculates, based on the device information of each image forming apparatus stored in advance, the compatibility of each image forming apparatus with the request of setting information of the received print data. Then, in response to a list request from the image forming apparatus, the server transmits the compatibility of each image forming apparatus corresponding to the print data together with the print data list, to the image forming apparatus, and the image forming apparatus displays the information to the user. Thus, it becomes possible for the user to select the print data as the object of image formation while making reference to the compatibility of each image forming apparatus.

Preferably, the display unit further displays the compatibility of each of the at least one image forming apparatus with respect to specific print data.

Preferably, the image forming apparatus is configured to selectively support a plurality of functions; the setting information includes setting of a process that depends on any of the plurality of functions; the device information includes a state information of support of the plurality of functions in the image forming apparatus; and the compatibility calculating unit calculates the compatibility based on the supported functions among functions necessary for executing the process designated in the setting information and on the weight corresponding to each function.

More preferably, the plurality of functions include a function related to a process during image formation and a function related to a process after image formation, and the weight corresponding to the function related to the process during image formation is different from the weight corresponding to the function related to the process after image formation.

Preferably, the display unit displays the print data satisfying all requests in the setting information in a manner different from other print data.

Preferably, the setting information includes setting of at least one of double-sided printing, reduced printing, sort output, group output, stapling and punching.

According to a still further aspect, the present invention provides an image forming apparatus capable of selectively obtaining print data from a server. The server receives print data including setting information related to image formation from an information processing apparatus and stores the print data, and the image forming apparatus includes a list requesting unit for transmitting a list request to the server in accordance with a user operation. The server transmits a list of the print data stored therein and the setting information included in the print data, in response to the list request, and the image forming apparatus further includes: a compatibility calculating unit receiving the setting information from the server and calculating compatibility as a degree representing to which extent the request of setting information can be satisfied, based on predetermined device information, a display unit displaying the list of the print data from the server and the compatibility corresponding to the print data, and a data requesting unit transmitting the data request for specifying selected print data to the server, in accordance with a user operation. The server transmits specific print data to the image forming apparatus in response to the data request, and the image forming apparatus further includes a processing unit for performing an image forming process based on the print data from the server.

Preferably, the image forming apparatus is configured to selectively support a plurality of functions; the setting information includes setting of a process that depends on any of the plurality of functions; the device information includes a state information of support of the plurality of functions in the image forming apparatus; and the compatibility calculating unit calculates the compatibility based on the supported functions among functions necessary for executing the process designated in the setting information and on the weight corresponding to each function.

According to a still further aspect, the present invention provides an image forming method using an image forming system. The image forming system includes at least one information processing apparatus capable of transmitting print data including setting information related to image formation, a server receiving the print data from the information processing apparatus, and at least one image forming apparatus capable of data communication with the server. The image forming method includes the steps of: the server storing the print data transmitted from the information processing apparatus, the image forming apparatus transmitting a list request to the server in accordance with a user operation; the server transmitting the setting information included in the print data together with a list of the print data stored therein, in response to the list request from the image forming apparatus, the image forming apparatus receiving the setting information from the server and calculating compatibility as a degree representing to which extent the request of setting information can be satisfied, based on predetermined device information; the image forming apparatus displaying the list of the print data from the server and the compatibility corresponding to the print data, the image forming apparatus transmitting a data request for specifying a selected print data to the server in accordance with a user operation; the server transmitting a specific print data to the image forming apparatus in response to a data request from the image forming apparatus; and the image forming apparatus performing an image forming process based on the print data from the server.

Preferably, the image forming apparatus is configured to selectively support a plurality of functions; the setting information includes setting of a process that depends on any of the plurality of functions; the device information includes a state information of support of the plurality of functions in the image forming apparatus; and the calculating step includes the step of calculating compatibility based on the supported functions among functions necessary for executing the process designated in the setting information and on the weight corresponding to each function.

According to a still further aspect, the present invention provides an image forming method using an image forming system. The image forming system includes at least one information processing apparatus capable of transmitting print data including setting information related to image formation, a server receiving the print data from the information processing apparatus, and at least one image forming apparatus capable of data communication with the server, and the server stores in advance device information of each of the at least one image forming apparatus. The image forming method includes the steps of the server storing the print data transmitted from the information processing apparatus; the server calculating, for each of the at least one image forming apparatus, compatibility as a degree representing to which extent the request of setting information of the print data can be satisfied, based on the device information of each of the at least one image forming apparatus; the image forming apparatus transmitting a list request to the server in accordance with a user operation; the server transmitting the compatibility of each of the at least one image forming apparatus corresponding to the print data together with a list of the print data stored therein to the image forming apparatus, in response to the list request from the image forming apparatus; the image forming apparatus displaying the list of print data from the server and a representative value of the compatibility of each of the at least one image forming apparatuses corresponding to the print data; the image forming apparatus transmitting a data request for specifying a selected print data to the server in accordance with a user operation; the server transmitting a specific print data to the image forming apparatus in response to the data request from the image forming apparatus; and the image forming apparatus performing an image forming process based on the print data from the server.

Preferably, the step of displaying includes the step of further displaying the compatibility of each of the at least one image forming apparatus, for the specific print data.

Preferably, the image forming apparatus is configured to selectively support a plurality of functions; the setting information includes setting of a process that depends on any of the plurality of functions; the device information includes a state information of support of the plurality of functions in the image forming apparatus; and the calculating step includes the step of calculating compatibility based on the supported functions among functions necessary for executing the process designated in the setting information and on the weight corresponding to each function.

According to the present invention, it is possible for the user to appropriately select an image forming apparatus to be used, when an image is to be formed on print data that may contain request dependent on a specific function.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10 shows an example of data structure stored in a print list storage unit of the server in accordance with Embodiment 1 of the present invention.

FIG. 11 shows an example of data structure stored in a network setting data storage unit of the server in accordance with Embodiment 1 of the present invention.

FIG. 14 shows an example of data structure stored in a device information storage unit of the image forming apparatus in accordance with Embodiment 1 of the present invention.

FIG. 15 shows an example of data structure stored in a weight coefficient storage unit of the image forming apparatus in accordance with Embodiment 1 of the present invention.

FIG. 16 represents compatibility calculating process by a compatibility calculating unit of the image forming apparatus in accordance with Embodiment 1 of the present invention.

FIG. 21 shows an example of data structure stored in the device information storage unit of the server in accordance with Embodiment 2 of the present invention.

FIG. 22 shows an example of data structure stored in the compatibility storage unit of the server in accordance with Embodiment 2 of the present invention.

DESCRIPTION OF THE PREFERRED EMBODIMENTS

Figure 1:
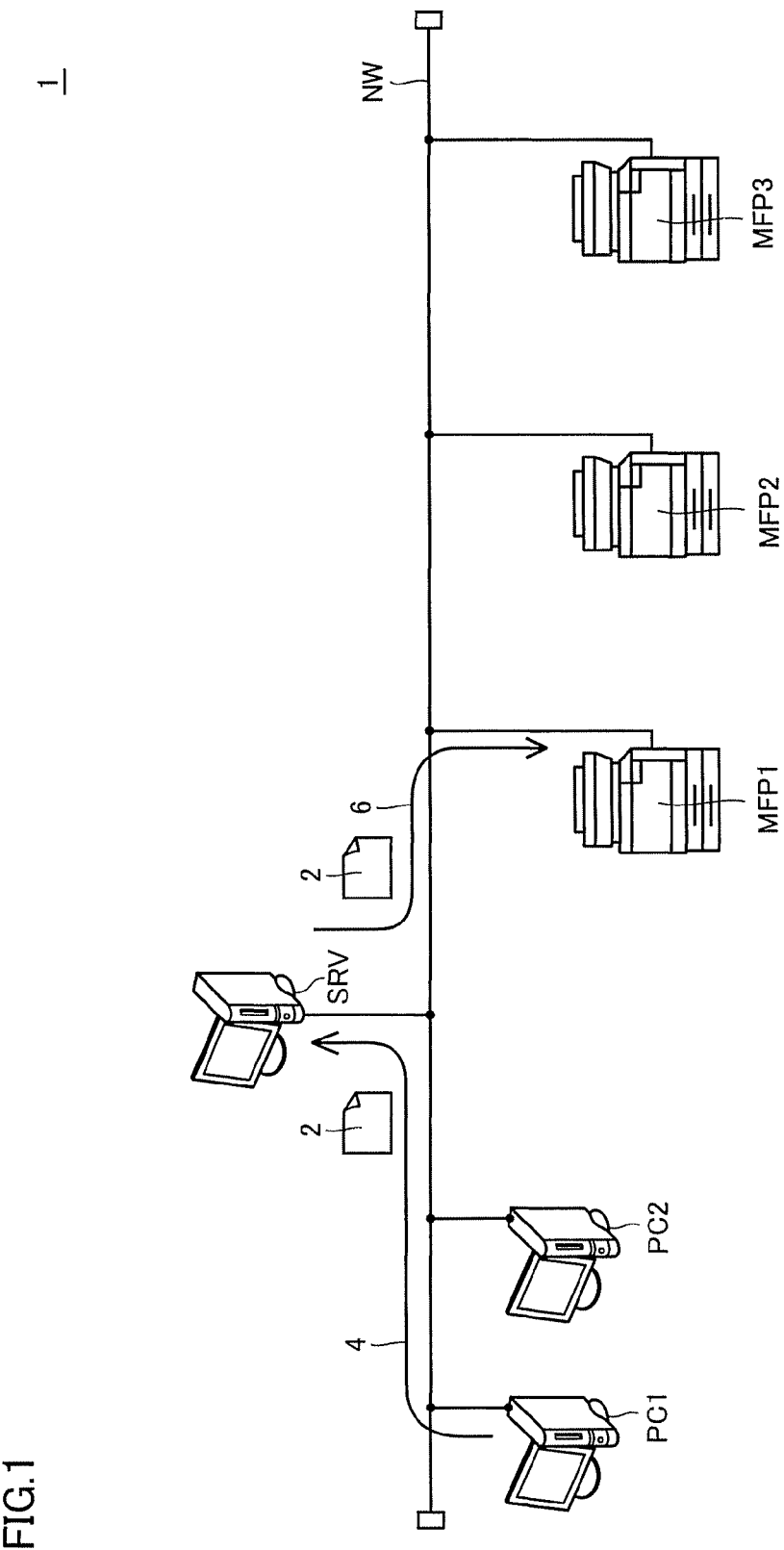
FIG. 1 schematically shows a configuration of the image forming system in accordance with Embodiment 1 of the present invention.

Embodiments of the present invention will be described in detail with reference to the figures. In the figures, the same or corresponding portions are denoted by the same reference characters and description thereof will not be repeated.

Embodiment 1

(Overall Configuration of Image Forming System)

Referring to FIG. 1, an image forming system 1 in accordance with Embodiment 1 of the present invention includes personal computers PC1 and PC2 as representative examples of image processing apparatus, a server SRV, and image forming apparatuses MFP1, MFP2 and MFP3, all connected to one same network NW.

Personal computers PC1 and PC2, server SRV, and image forming apparatuses MFP1, MFP2 and MFP3 are configured to allow data communication with each other. The network NW may be a private line such as LAN (Local Area Network) or WAN (Wide Area Network), or a public line such as virtual private network, which may be partially or fully implemented to realize wireless communication such as wireless LAN. The present invention is applicable to a configuration that allows data communication between personal computer PC1 or PC2 and server SRV and between the server SRV and image forming apparatus MFP1, MFP2 or MFP3, and therefore, independent networks may be formed to connect these components to each other.

In personal computers PC1 and PC2, application programs including document creation and spread sheet are installed, and print data 2 is generated from a document or the like formed by the user using such an application program. More specifically, a printer driver installed beforehand in personal computer PC1 or PC2 generates control codes (typically, a page description language) that can be interpreted by image forming apparatuses MFP1 to MFP3, in accordance with a drawing instruction output from the application program or the operating system (OS). The print data 2 includes setting information related to printing, set by the user at the time of generation.

Personal computer PC1, PC2 transmits print data 2 generated in this manner to server SRV (transmission path 4). When pull print is not performed, the print data 2 may directly be transmitted to any of image forming apparatuses MFP1 to MFP3.

Server SRV receives and stores the print data 2 transmitted from personal computer PC1, PC2, and when it receives a pull print request from any of image forming apparatuses MFP1 to MFP3, transmits the stored print data 2 to the image forming apparatus that issued the request (transmission path 6).

Image forming apparatuses MFP1 to MFP3 are typically a Multi Function Peripheral (MFP) having a plurality of functions including copying function, facsimile function and scanner function. In accordance with a user operation, image forming apparatuses MFP1 to MFP3 transmit, to the server SRV, a pull print request for pulling selected print data, that is, for obtaining the print data, from among the print data stored in the server SRV. Receiving the print data 2 from server SRV, image forming apparatuses MFP1 to MFP3 perform image forming process. The image forming process includes printing on paper medium and facsimile transmission.

Particularly, image forming apparatuses MFP1 to MFP3 in accordance with the present embodiment calculate in advance the degree regarding to which extent the request of setting information included in each print data can be satisfied, for the print data stored in the server (which degree will be hereinafter also referred to as "compatibility"), When a screen image urging the user to select print data is displayed, image forming apparatuses MFP1 to MFP3 display a list of print data stored in server SRV and the compatibility corresponding to each print data. By such indication of compatibility, it becomes possible for the user to appropriately select the image forming apparatus to be used.

In the following, a configuration that realizes such a function will be described. In the following, personal computers PC1 and PC2 will be generally represented as "personal computer PC" and image forming apparatuses MP1 to MFP3 will be generally represented as "image forming apparatus MFP."

(Hardware Configuration of Image Forming Apparatus)

Figure 2:
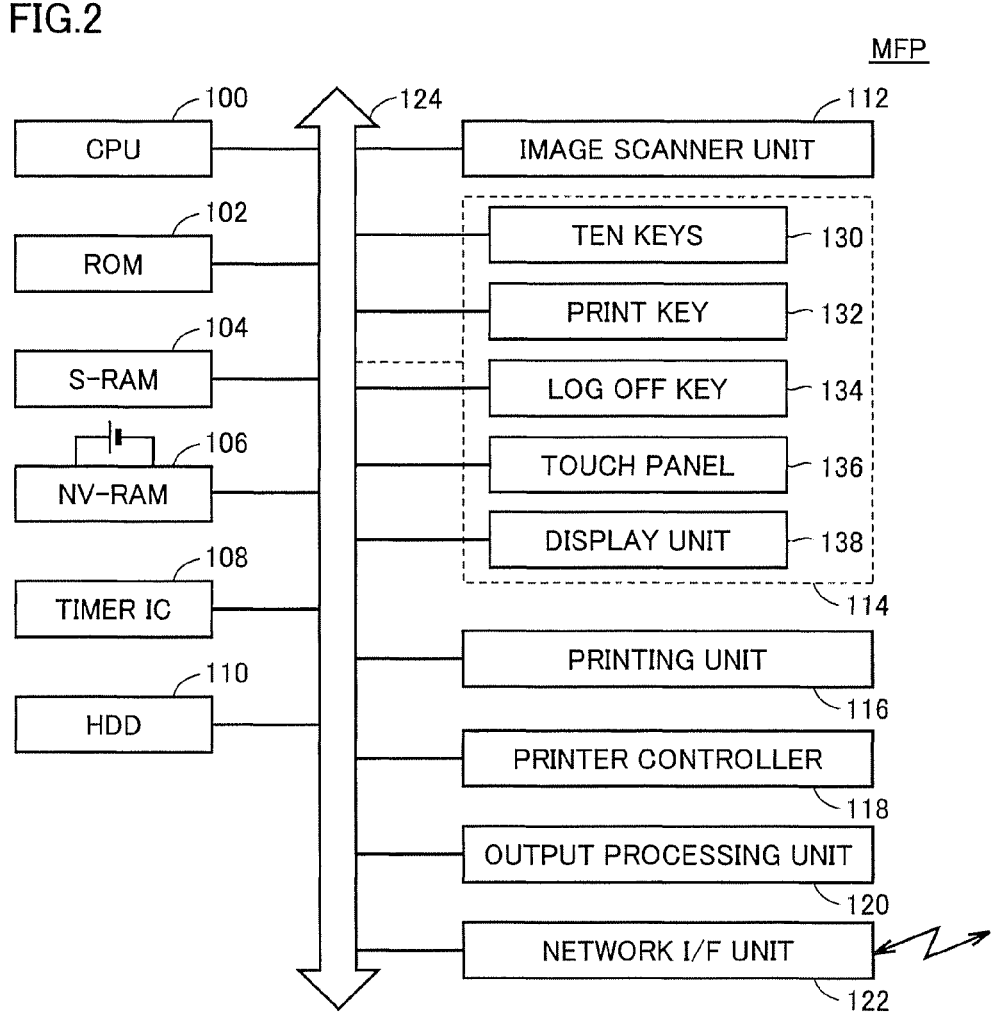
FIG. 2 schematically shows plain hardware configuration of the image forming apparatus in accordance with Embodiment 1 of the present invention.

Referring to FIG. 2, image forming apparatus MFP in accordance with Embodiment 1 of the present invention includes a CPU (Central Processing Unit) 100, an ROM (Read Only Memory) 102, an S-RAM (Static-Random Access Memory) 104, an NV-RAM (Non-Volatile Random Access Memory) 106, and a timer IC (Integrated Circuit) 108. These parts are connected to each other through a bus 124.

CPU 100 reads a program stored in advance in ROM 102 or the like to S-RAM 104 as a work memory and executes the program, whereby the process in accordance with the present embodiment is realized. Further, NV-RAM 106 stores various settings related to image formation of the MFP in a non-volatile manner. Particularly, NV-RAM 106 stores device information including the state of functions supported in the image forming apparatus MFP. Such device information is set before shipment, or by a maintenance person when a new function is added. Alternatively, CPU 100 may periodically detect supported functions and the device information may be updated accordingly. Timer IC 108 is configured to include a quartz oscillator or the like and measures current time.

Image forming apparatus MFP further includes an image scanner unit 112, an operation panel unit 114, a printing unit 116, a printer controller 118, and an output processing unit 120.

Image scanner unit 112 is a part for realizing the scanner function, at which a document is scanned and image data is generated. Typically, image scanner unit 112 includes a loading tray for setting the document, a platen glass, a feeding unit for feeding the document set on the loading tray to the platen glass one by one, and an ejection tray for ejecting the scanned document (all not shown). It is noted that image scanner unit 112 is not always necessary to realize the pull print configuration in accordance with the present invention.

Operation panel unit 114 includes ten-keys 130, a PRINT key 132, a log-off key 134, a touch panel 136 and a display unit 138 integrated together, and it is placed on a surface portion of image forming apparatus MFP. Ten-keys 130, PRINT key 132, log-off key 124 and touch panel 136 function as an input unit for receiving a user operation, and display unit 138 functions as a display for presenting screen images urging the user to make selection or determine various settings. Display unit 138 is typically implemented by a liquid crystal panel or the like, and touch panel 136 is arranged on the display surface of display unit 138.

Printing unit 116 is a part for performing the process of printing the image on paper medium, and it typically includes an image forming unit including an exposurer and a developing roller, a transfer roller for transferring the toner image formed by the image forming unit to the paper medium, a fixer for fixing the transferred toner image, and a control circuit controlling operation of these units.

Printer controller 118 converts print data from personal computer PC or image data scanned by image scanner unit 112 to data suitable for the print process at printing unit 116. Typically, when the image forming apparatus MFP is for color processing, printer controller 118 converts the print data or image data to raster data of four colors, that is, yellow (Y), magenta (M), cyan (C) and black (K), and outputs the raster data of respective colors to printing unit 116.

Output processing unit 120 is a part for processing the paper medium after the image is formed thereon by printing unit 116, and typically it performs the processes of "sort", "group", "staple" and "punch". Here, "sort" refers to a process in which, when a number of copies of a document containing a plurality of pages are to be output, sheets of paper having images formed in the same page order as the original document (collated sheets) are output by the set number of copies. "Group" refers to a process in which sheets of paper of the set number of copies are output grouped by page of the original document. "Staple" refers to a process of fastening the output sheets of paper by staples, and "punch" refers to a process of punching a hole or holes in the output sheets of paper.

Further, image forming apparatus MFP includes a hard disk unit (HDD Hard Disk Drive) 110 and a network interface (I/F) unit 122.

Hard disk unit 110 is a storage unit for storing relatively large amount of data in a non-volatile manner, and it stores print data from personal computer PC and image data scanned by image scanner unit 112. Network interface unit 122 is a part for enabling data communication with personal computer PC or server SRV through the network NW.

(Hardware Configuration of Personal Computer and Server)

Figure 3:
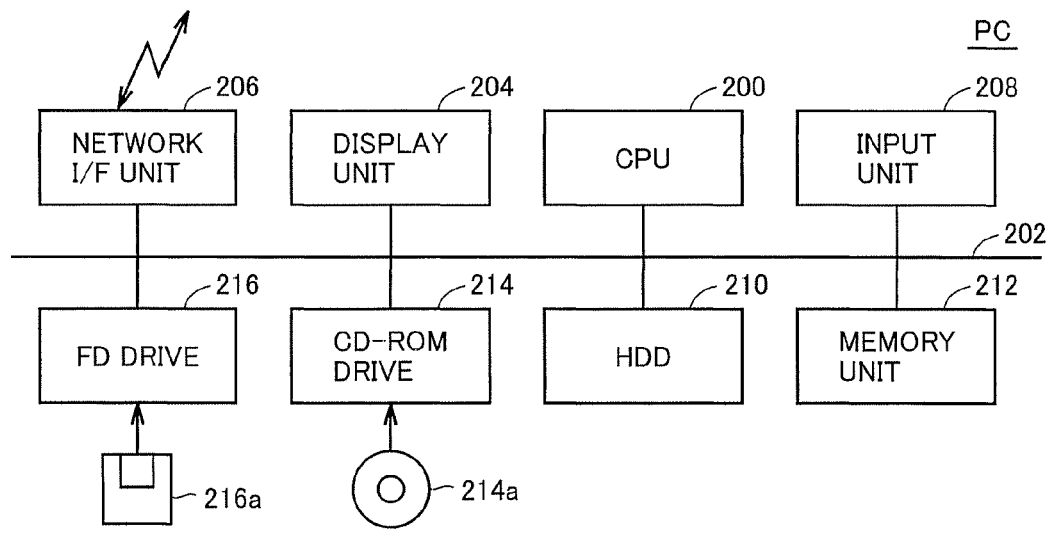
FIG. 3 schematically shows plain hardware configuration of the personal computer in accordance with Embodiment 1 of the present invention.

Referring to FIG. 3, personal computer PC in accordance with Embodiment 1 of the present invention includes a CPU 200 executing various programs including the operating system, a memory unit 212 temporarily storing data necessary for executing a program in CPU 200, and a hard disk unit 210 for storing the program to be executed by CPU 200 in a non-volatile manner. Such a program is read by a CD-ROM (Compact Disk-Read Only Memory) drive 214 or a flexible disk (FD) drive 216 from a CD-ROM 214*a* or a flexible disk 216*a*, respectively.

CPU 200 receives an operation request from the user through an input unit 208 implemented by a keyboard or a mouse, and provides a screen image output generated by execution of a program to a display unit 204. Further, CPU 200 performs data communication with server SRV or image forming apparatus MFP through network interface (I/F) unit 206 provided by an LAN card or the like. These parts are connected to each other through an internal bus 202.

The hardware configuration of server SRV is basically similar to that shown in FIG. 3 and, therefore, detailed description will not be repeated. In server SRV, the print data from personal computer PC is stored in hard disk unit 210.

(Overall Process Sequence of Image Forming System)

First, the overall process in the image forming system in accordance with the present embodiment will be described with reference to FIG. 4.

Figure 4:
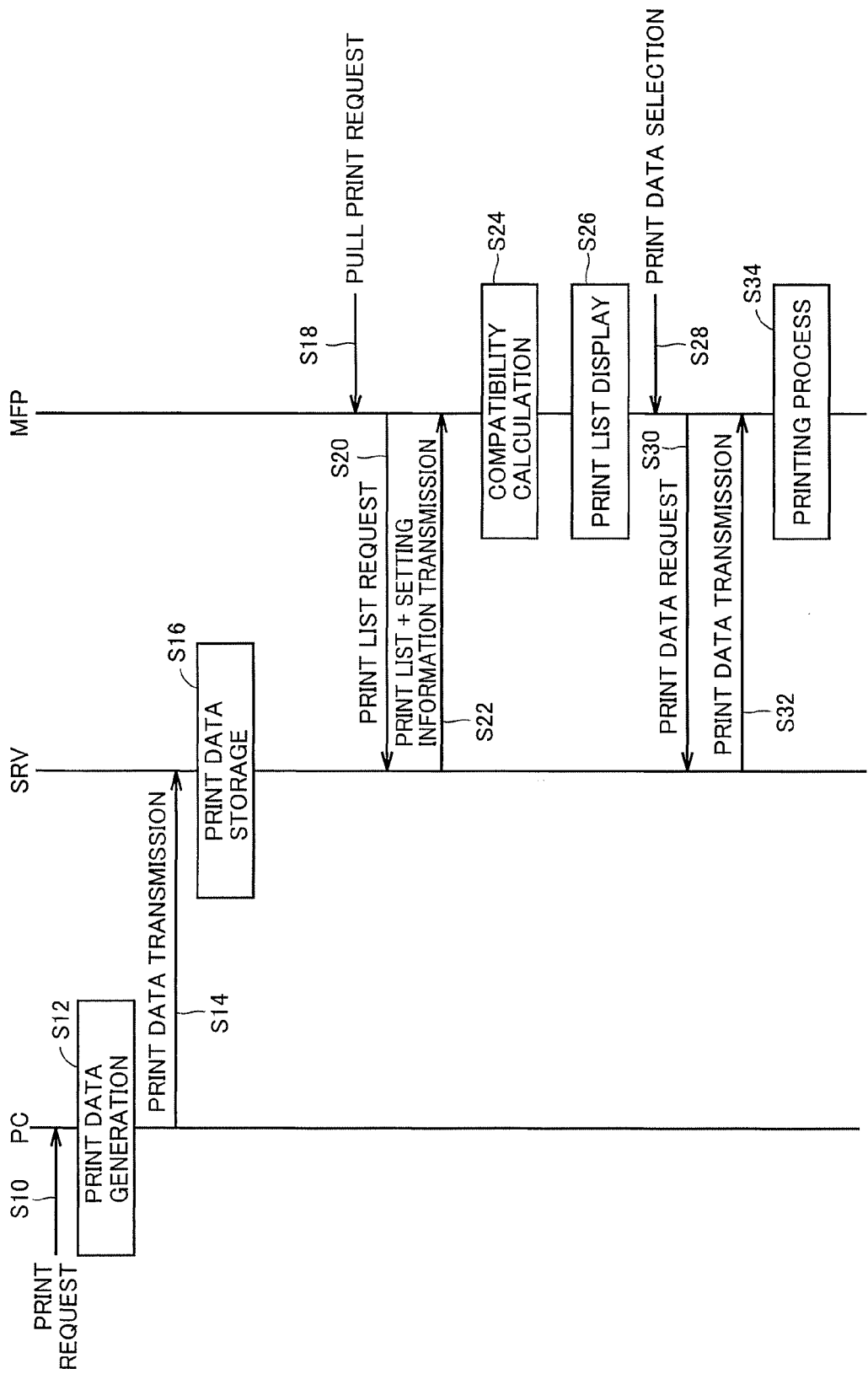
FIG. 4 is a sequence diagram representing the overall process procedure in the image forming system in accordance with Embodiment 1 of the present invention.

Referring to FIG. 4, first, to an application program executed on personal computer PC, the user applies a print request by an operation of a mouse or the like (step S10), and then, personal computer PC generates print data in accordance with the application program (step S12). As described above, when the print data is generated, it is possible for the user to freely set items (setting items) related to printing, and the print data includes the setting information set by the user. Personal computer PC transmits the generated print data to server SRV (step S14). Then, server SRV stores the print data from personal computer PC in hard disk unit 210 (FIG. 3) (step S16).

Next, the user operates operation panel unit 114 (FIG. 2) of image forming apparatus MFP and applies a pull print request (step S18), and then image forming apparatus MFP transmits a print list request to server SRV (step S20). In response to the print list request, server SRV transmits the list of stored print data and setting information of each print data to image forming apparatus MFP (step S22). When new print data from personal computer PC is stored, server SRV generates or updates the list of print data.

Image forming apparatus MFP receives the setting information of each print data from the server SRV, and based on the device information of itself, calculates the compatibility as the degree representing to which extent the request of setting information of each print data can be satisfied (step S24). Further, image forming apparatus MFP has the print list from server SRV and the compatibility corresponding to each print data in the list displayed on display unit 138 (FIG. 2) (step S26).

The user selects desired print data, with reference to the print list and the corresponding compatibility displayed on display unit 138 (step S28). In response to the user's selection of the print data, image forming apparatus MFP transmits a print data request for specifying the selected print data, to server SRV (step S30), In response to the print data request, server SRV transmits the specific print data among the stored print data to image forming apparatus MFP (step S32). Based on the print data from server SRV, image forming apparatus MFP executes the printing process (step S34). Through the above-described process procedure, the pull print process is finished.

In the following, the functional configuration and process procedure of each apparatus will be described in detail.

(Functional Configuration and Process Procedure of Personal Computer)

Figure 5:
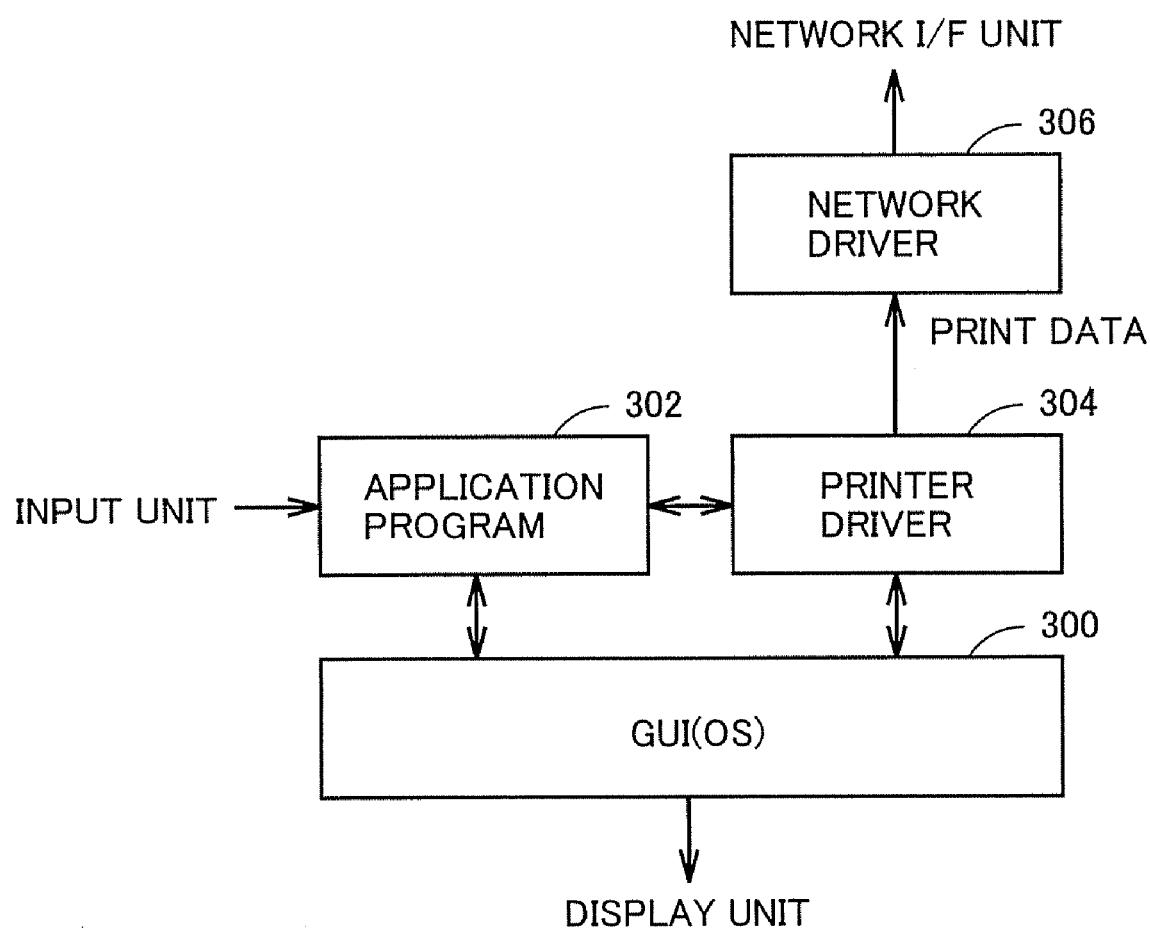
FIG. 5 is a block diagram showing a functional configuration related to print data generation in the personal computer in accordance with Embodiment 1 of the present invention.

FIG. 5 is a block diagram showing a functional configuration related to print data generation in the personal computer PC in accordance with Embodiment 1 of the present invention. These functions are realized when CPU 200 reads a program stored in advance in hard disk unit 210 or the like to memory unit 212 and executes the program.

Referring to FIG. 5, personal computer PC includes, as its functions, GUI 300 as a part of the OS, an application program 302, a printer driver 304, and a network driver 306.

GUI 300 updates image display on display unit 204 (FIG. 3), in response to a drawing instruction output from application program 302 or printer driver 304. Application program 302 is typically a program for document creation or spread sheet processing, and executes various processes in accordance with an operation of input unit 208 (FIG. 3) by the user. Printer driver 304 generates print data in accordance with the output of application program 302, in response to the print instruction and the drawing instruction from application program 302. Further, printer driver 304 displays a print setting image allowing the user to perform print setting, on display unit 204, when the print data is generated. Receiving the print data from printer driver 304, network driver 306 controls network interface unit 206 (FIG. 2) and transmits the print data to server SRV.

Figure 6:
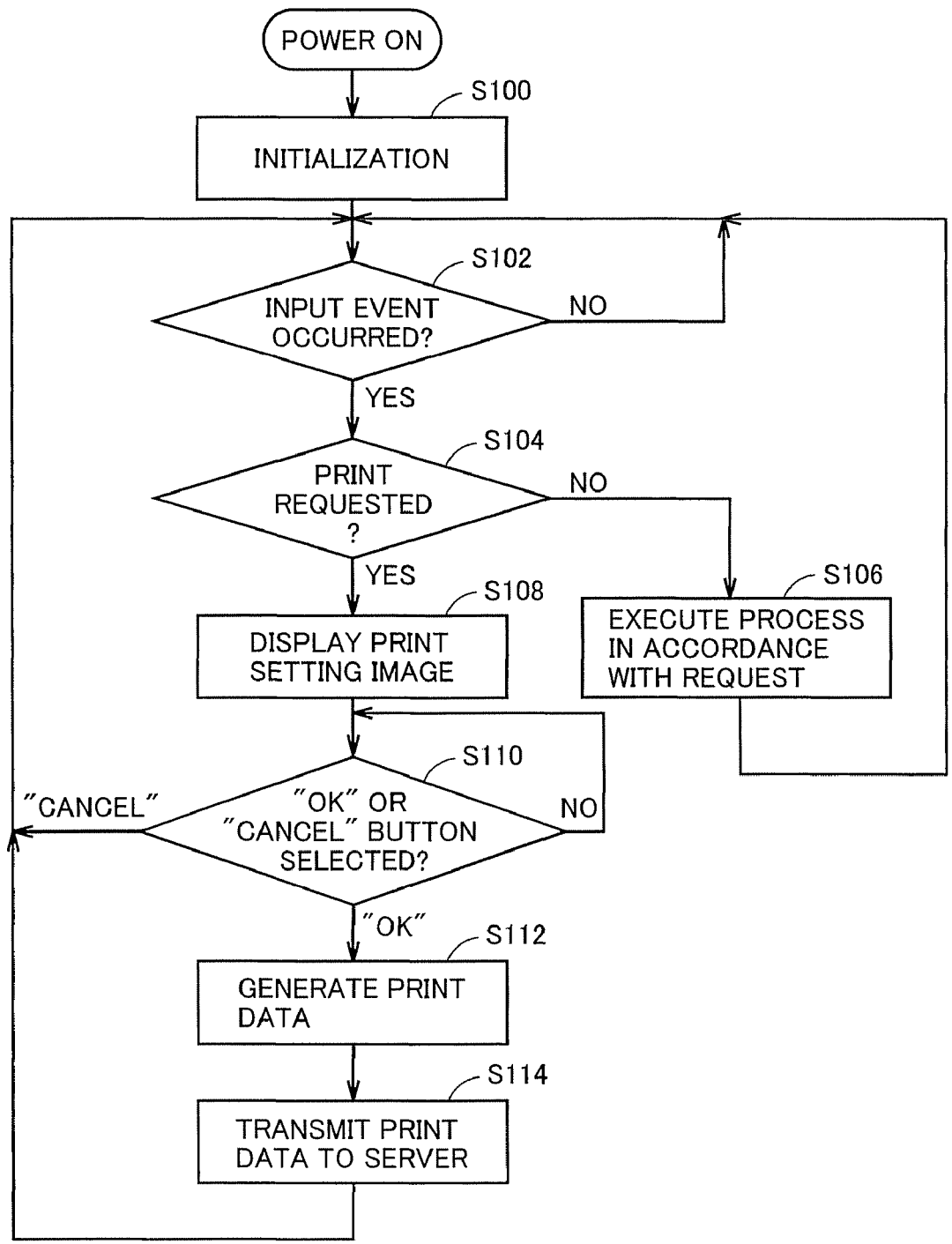
FIG. 6 is a flowchart representing process procedure related to print data generation in the personal computer in accordance with Embodiment 1 of the present invention.

FIG. 6 shows process procedure related to print data generation in the personal computer PC in accordance with Embodiment 1 of the present invention.

Referring to FIGS. 3 and 6, first, when the user turns on the power of personal computer PC, personal computer PC is activated and initialization takes place (step S100). Initialization includes general processes such as clearing of memory unit 212, loading of the OS to memory unit 212, execution of the OS by CPU 200 and setting of initial values (default values). After the end of initialization, CPU 200 determines whether there is any input event (operation request) occurred by a user operation through input unit 208 (step S102). If there is no input event occurred (NO at step S102), CPU 200 waits until any input event occurs (step S102).

If there is any input event occurred (YES at step S102), CPU 200 determines whether the occurred event is a print request or not (step S104). If the occurred event is not a print request (NO at step S104), a process in accordance with the request is executed (step S106). After execution of the process, CPU 200 again waits until occurrence of any input event (step S102).

If the occurred event is a print request (YES at step S104), CPU 200 displays a print setting image on display unit 204 (step S108). More specifically, printer driver 304 shown in FIG. 5 outputs a drawing instruction for displaying the prescribed print setting image to GUI 300, and GUI 300 outputs a signal for displaying the print setting image to display unit 204.

Figures 7, 8:
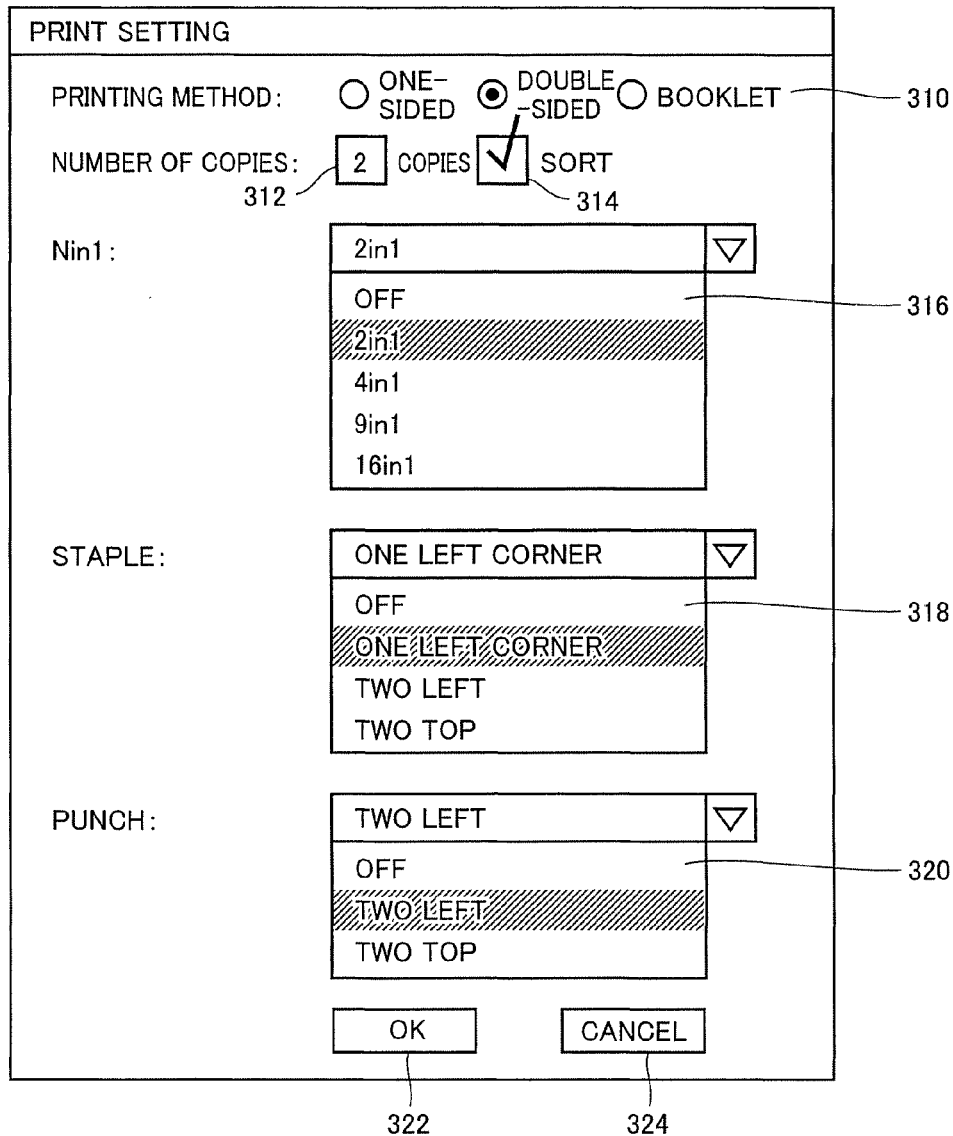
FIG. 7 shows an example of a print setting image in the personal computer in accordance with Embodiment 1 of the present invention.
FIG. 8 shows an example of print data generated by the personal computer in accordance with Embodiment 1 of the present invention.

FIG. 7 shows an example of the print setting image of the personal computer PC in accordance with Embodiment 1 of the present invention.

Referring to FIG. 7, by way of example, on the print setting image, six setting items 310, 312, 314, 316, 318 and 320 of "printing method", "number of copies", "sort", "Nin1", "staple" and "punch" are arranged, respectively. Here, as to the setting item 310 of "printing method", one of "one-sided", "double-sided" and "booklet" is selectable, and by the selection, one-sided printing, double-sided printing and booklet printing are designated, respectively. By the setting item "number of copies", the number of copies to be output from image forming apparatus MFP can be input arbitrarily. By the setting item 314 of "sort", whether sorting process is necessary or not at the time of output from image forming apparatus MFP or not can be set by checking the box. By setting item 316 of "Nin1", setting for reduced printing of a plurality of pages on one sheet can be selected, by selecting one from a pull down menu. For instance, "2in1" represents reduced printing of images of two pages on one sheet of paper. By the setting item 318 of "staple", one setting of a position where the sheets output from the image forming apparatus are fastened by the staple can be selected from the pull down menu. By the setting item 320 of "punch", one setting of a position, where holes are punched in the sheets output from the image forming apparatus, can be selected from the pull down menu.

In this manner, the user can arbitrarily determine the print setting on the personal computer PC. These setting items, however, define processes dependent on any of a plurality of functions supported by the image forming apparatus MFP, and dependent on the state of functions supported by the image forming apparatus MFP as the output destination, it is not always possible to execute the image forming process fully reflecting these setting items.

When the user sets print setting and selects "OK" button 322, print setting is complete. When "CANCEL" button 324 is selected, the print setting is cancelled, and subsequent process of generating print data is not executed.

Again referring to FIG. 6, CPU 200 confirms whether "OK" button 322 or "CANCEL" button 324 is selected (step S110). When neither of "OK" button 322 nor "CANCEL" button 324 is selected (NO at step S110), CPU 200 waits until either "OK" button 322 or "CANCEL" button 324 is selected (step S110).

When "OK" button 322 is selected ("OK" at step S110), CPU 200 generates print data based on the print setting set by the user (step S112). Then, CPU 200 transmits the generated print data to server SRV (step S114). Then, the process returns to step S102.

In contrast, when "CANCEL" button 324 is selected ("CANCEL" at step S110), CPU 200 does not generate any print data and the process returns to step S102.

Though an example in which the print setting image is always displayed has been described in connection with the flowchart above, the print data may be generated in accordance with the initial setting without displaying the print setting image, if the user does not request any change from the initial setting (default setting) set in advance.

FIG. 8 shows an example of the print data generated by the personal computer PC in accordance with Embodiment 1 of the present invention. The print data in accordance with the present embodiment is generated using PDL (Printer Description Language) as page description language designating character data to be output as well as information of corresponding font type and position of arrangement. Representative examples of PDL include PCL (Printer Command Language) and PostScript, and in FIG. 8, print data prepared by PCL is shown as an example.

Referring to FIG. 8, the print data includes setting information 330 describing the print setting, and data body 332. Though data body 332 actually may include huge amount of control codes, it is shown in a simplified manner in FIG. 8.

Setting information 330 consists of control codes each starting with "PJL (Print Job Language)", indicating that it is a print setting. By way of example, FIG. 8 shows seven lines of control codes 331 to 337. Control codes 331 to 337 describe "resolution", "number of copies", "necessity of double-sided printing", "necessity and position of stapling", "necessity of finisher process", "necessity of punching" and "designation of print language", respectively.

In this manner, personal computer PC transmits the print data containing the setting information related to printing set by the user, to server SRV.

(Functional Configuration and Process Procedure of Server)

Figure 9:
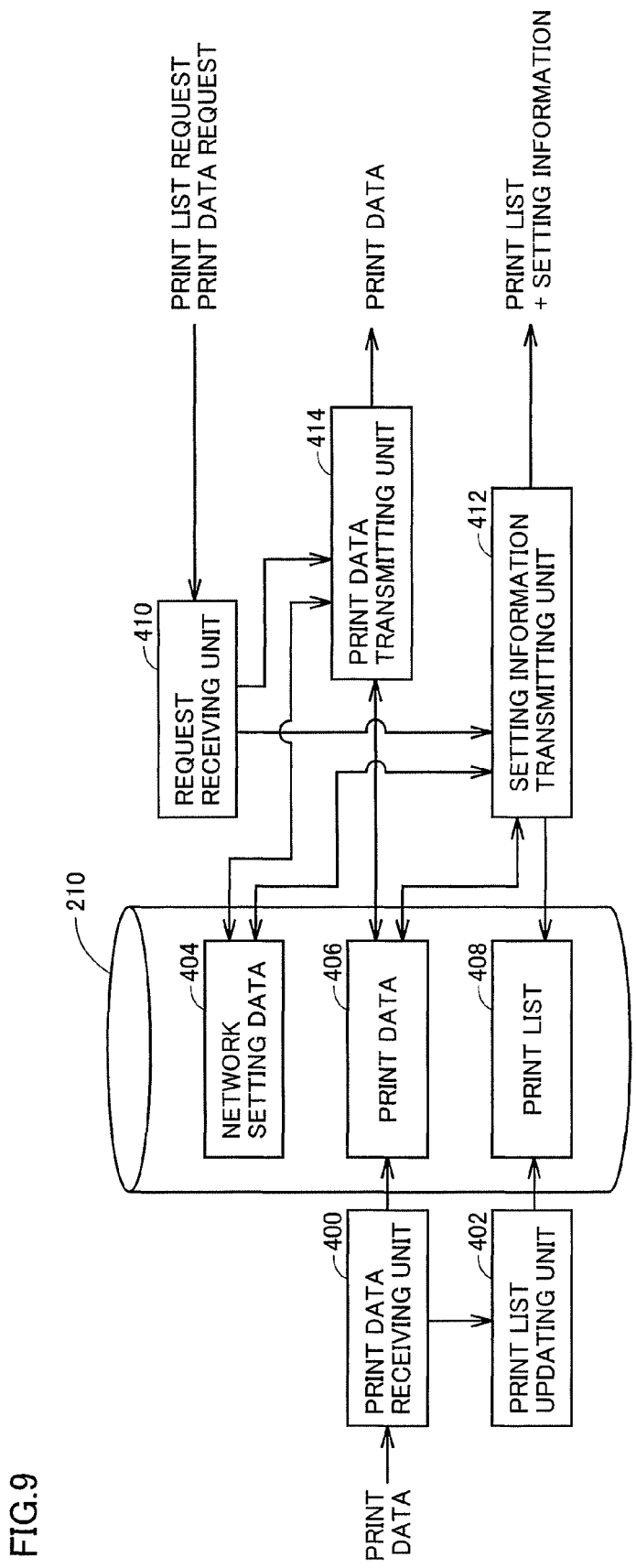
FIG. 9 is a block diagram showing functional configuration of a server in accordance with Embodiment 1 of the present invention.

Referring to FIG. 9, server SRV in accordance with Embodiment 1 of the present invention includes a print data receiving unit 400, a print list updating unit 402, a network setting data storage unit 404, a print data storage unit 406, a print list storage unit 408, a request receiving unit 410, a setting information transmitting unit 412, and a print data transmitting unit 414 as its functions. Print data receiving unit 400, print list updating unit 402, request receiving unit 410, setting information transmitting unit 412 and print data transmitting unit 414 are realized by CPU 200 reading a program stored in advance in hard disk unit 210 or the like to memory unit 212 and executing the program. Further, network setting data storage unit 404, print data storage unit 406 and print list storage unit 408 are formed in a prescribed area of hard disk unit 210.

Print data receiving unit 400 receives print data from personal computer PC, and stores the received print data in print data storage unit 406. Further, print data receiving unit 400 outputs information including document name, transmission source, data size and the like of the received print data, to print list updating unit 402. Print list updating unit 402 newly generates the list of print data (print list) or updates existing print list, based on the information from print data receiving unit 400. Then, print list updating unit 402 stores the generated or updated print list in print list storage unit 408.

FIG. 10 shows an example of data structure stored in print list storage unit 408 of the server SRV in accordance with Embodiment 1 of the present invention.

Referring to FIG. 10, print list updating unit 402 allocates job IDs as identification numbers successively to the print data received from personal computer PC, and obtains document names (file names). Then, print list updating unit 402 stores in the form of a list, the job IDs and the corresponding document names, in print list storage unit 408.

Again referring to FIG. 9, network setting data storage unit 404 stores network setting information of the image forming apparatus MFP capable of data communication with server SRV. Specifically, network setting data storage unit 404 stores network address (typically, IP address) of each image forming apparatus MFP, and these pieces of information are set beforehand.

FIG. 11 shows an example of data structure stored in network setting data storage unit 404 of the server SRV in accordance with Embodiment 1 of the present invention.

Referring to FIG. 11, network setting data storage unit 404 stores the IP address and the machine type, in correspondence with the name of each image forming apparatus MFP capable of data communication with the server SRV. The setting information transmitting unit 412 and print data transmitting unit 414, which will be described later, obtain the data transmission destination based on these pieces of information stored in network setting data storage unit 404.

Again referring to FIG. 9, request receiving unit 410 receives a request transmitted from any of the image forming apparatuses MFP, and determines whether the received request is a print list request or a print data request. When the print list request is received, request receiving unit 410 outputs the print list request to setting information transmitting unit 412, and when the print data request is received, the request receiving unit 410 outputs the print data request to print data transmitting unit 414. When outputting the print list request or the print data request, request receiving unit 410 also outputs information for specifying the image forming apparatus MFP as the source of transmission of the corresponding request.

In response to the print list request from request receiving unit 410, setting information transmitting unit 412 reads the print list from print list storage unit 408, and extracts print data setting information (or setting information 330 of FIG. 8) stored in print data storage unit 406. Then, setting information transmitting unit 412 transmits the read print list together with the setting information of each print data, to image forming apparatus MFP as the source of request transmission.

In response to the print data request from request receiving unit 410, print data transmitting unit 414 reads the print data specified by the print data request from print data storage unit 406. Then, print data transmitting unit 414 transmits the read print data to the image forming apparatus MFP as the source of request transmission.

As to the correspondence between the present invention and various functional blocks shown in FIG. 9, print data storage unit 406 corresponds to the "data storage unit", setting information transmitting unit 412 corresponds to the "setting information transmitting unit", and print data transmitting unit 414 corresponds to the "print data transmitting unit", respectively.

Figure 12:
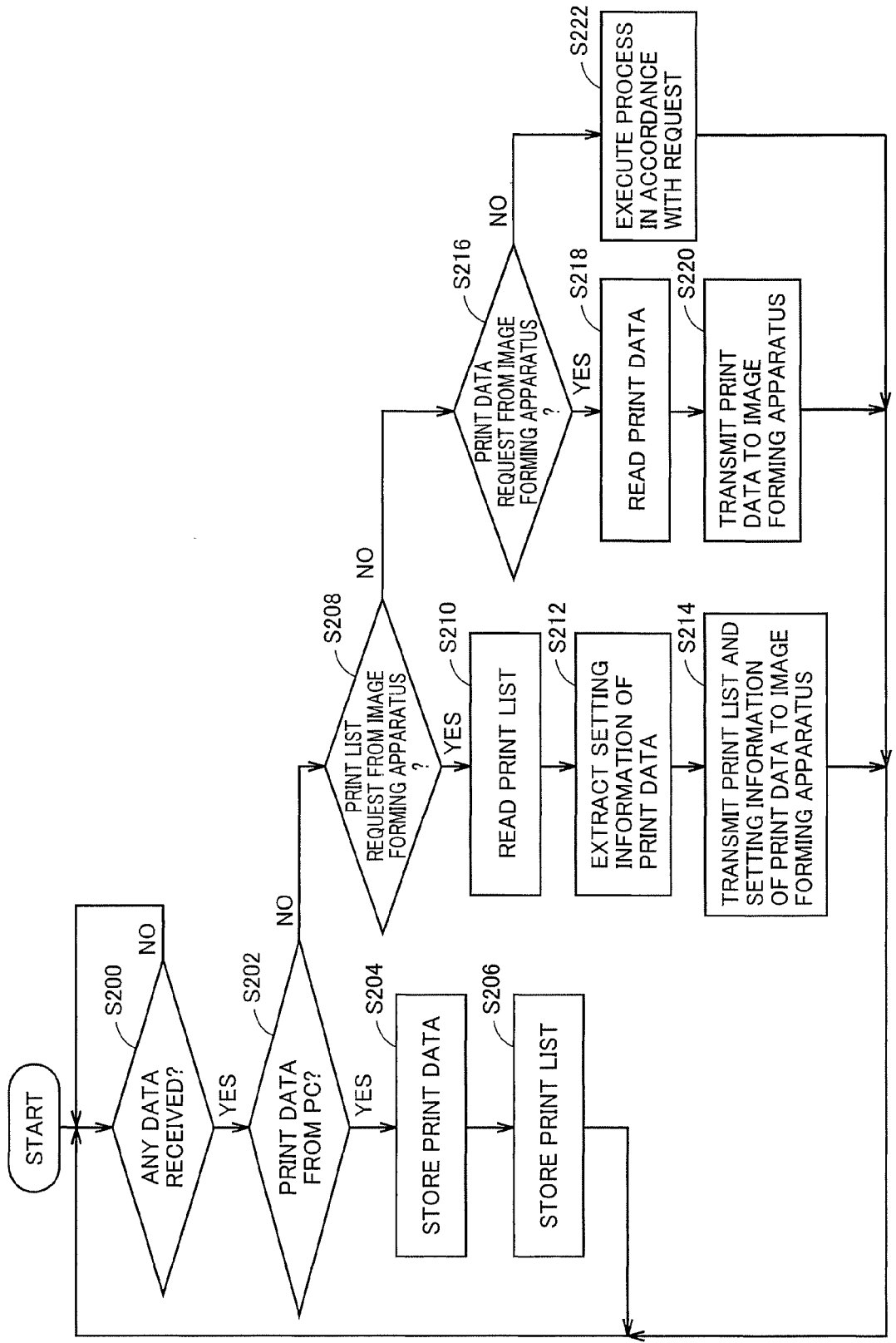
FIG. 12 is a flowchart representing process procedure in the server in accordance with Embodiment 1 of the present invention.

FIG. 12 shows process procedure in the server SRV in accordance with Embodiment 1 of the present invention.

Referring to FIGS. 9 and 12, first, CPU 200 functioning as print data receiving unit 400 and request receiving unit 410 determines whether any data is received through network interface unit 206 or not (step S200). If no data has been received (NO at step S200), CPU 200 waits until any data is received (step S200).

When any data is received (YES at step S200), CPU 200 determines whether the received data is print data from personal computer PC or not (step S202). If the received data is print data from the personal computer PC (YES at step S202), CPU 200 functioning as print data receiving unit 400 stores the received print data in print data storage unit 406 in hard disk unit 210 (step S204). Thereafter, CPU 200 functioning as print list updating unit 402 newly generates or updates the print list, and stores the generated or updated print list in print list storage unit 408 (step S206). Then, the process returns to step S200.

If the received data is not the print data from personal computer PC (NO at step S202), CPU 200 determines whether the received data is a print list request from image forming apparatus MFP or not (step S208). If the received data is a print list request from image forming apparatus MFP (YES at step S208), CPU 200 functioning as setting information transmitting unit 412 reads the print list from print list storage unit 408 in hard disk unit 210 (step S210) and extracts print data setting information stored in print data storage unit 406 in hard disk unit 210 (steps S212). Then, CPU 200 functioning as setting information transmitting unit 412 transmits the setting information of each print data to the image forming apparatus MFP as the source of request transmission, together with the read print list (step S214). Then, the process returns to step S200.

If the received data is not the print list request from image forming apparatus MFP (NO at step S208), CPU 200 determines whether the received data is a print data request from image forming apparatus MFP or not (step S216). If the received data is print data request from image forming apparatus MFP (YES at step S216), CPU 200 functioning as print data transmitting unit 414 reads the print data specified by the print data request, from print data storage unit 406 in hard disk unit 210 (step S218). Then, CPU 200 functioning as print data transmitting unit 414 transmits the read print data to image forming apparatus MFP as the source of request transmission (step S220). Then, the process returns to step S200.

If the received data is not the print data request from image forming apparatus MFP (NO at step S216), CPU 200 executes a process corresponding to the received request (step S222), and the process returns to step S200.

(Functional Structure and Process Procedure in Image Forming Apparatus)

Figure 13:
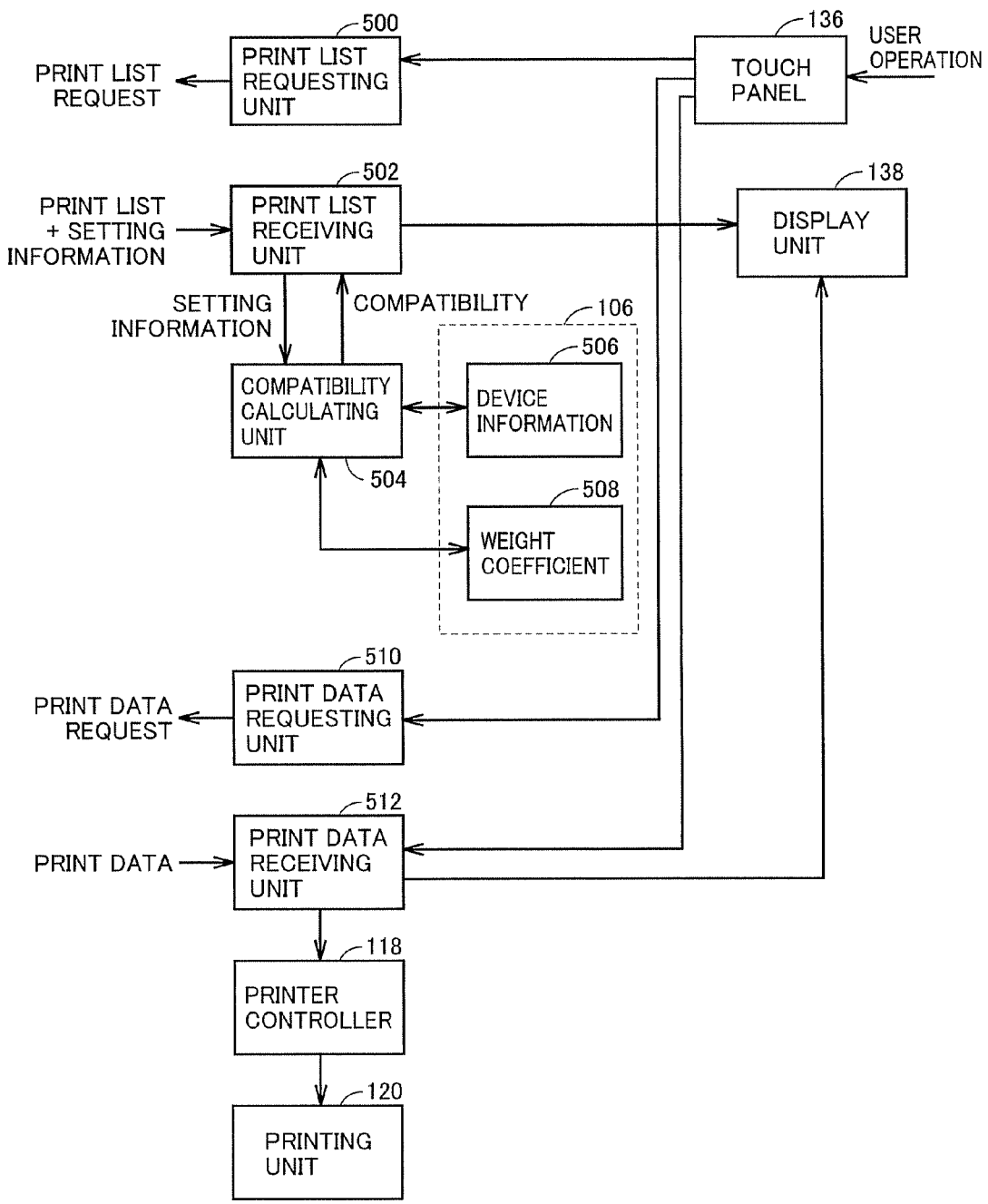
FIG. 13 is a block diagram showing a functional configuration of the image forming apparatus in accordance with Embodiment 1 of the present invention.

Referring to FIG. 13, image forming apparatus MFP in accordance with Embodiment 1 of the present invention includes a print list requesting unit 500, a print list receiving unit 502, a compatibility calculating unit 504, a device information storage unit 506, a weight coefficient storage unit 508, a print data requesting unit 510, and a print data receiving unit 512, as its functions. Print list requesting unit 500, print list receiving unit 502, compatibility calculating unit 504, print data requesting unit 510 and print data receiving unit 512 are realized by CPU 100 reading a program stored in advance in ROM 102 or the like to S-RAM 104 and executing the program. Device information storage unit 506 and weight coefficient storage unit 508 are formed in a prescribed area of NV-RAM 106.

Print list requesting unit 500 transmits the print list request to server SRV in accordance with an operation of touch panel 136 by the user.

Print list receiving unit 502 receives the print list and setting information from server SRV and outputs the setting information to compatibility calculating unit 504. Then, print list receiving unit 502 obtains compatibility for each print data calculated by compatibility calculating unit 504, and has the received print list and the compatibility corresponding to each print data displayed on display 138, as will be described later.

Compatibility calculating unit 504 calculates the compatibility based on the setting information from print list receiving unit 502 and the device information stored in advance in device information storage unit 506. More specifically, based on the device information, compatibility calculating unit 504 extracts, from the functions necessary to execute the process designated in the setting information, those functions that are supported by itself, reads the weight coefficients corresponding to the extracted functions from weight coefficient storage unit 508, and thereby calculates the compatibility.

FIG. 14 shows an example of data structure stored in device information storage unit 506 of image forming apparatus MFP in accordance with Embodiment 1 of the present invention.

Referring to FIG. 14, device information storage unit 506 stores, by way of example, the state of functions supported by the corresponding image forming apparatus MFP in the form of a list. Specifically, device information storage unit 506 stores, in correspondence to each of a plurality of functions that can be implemented in the image forming apparatus MFP, the value "Y" indicating that the function is supported or the value "N" indicating that the function is not supported.

FIG. 15 shows an example of data structure stored in weight coefficient storage unit 508 of image forming apparatus MFP in accordance with Embodiment 1 of the present invention.

Referring to FIG. 15, weight coefficient storage unit 508 stores, by way of example, weight coefficient of each of the items that can be set by the user on the side of personal computer PC, in the form of a list. Specifically, weight coefficient storage unit 508 stores a weight coefficient (positive value) in correspondence to each of the setting items that can be included in the setting information of the print data.

Though the value of each weight coefficient can be set arbitrarily in accordance with the content of corresponding setting item, it is preferred as an example that items related to processes during image formation and items related to processes after image formation are classified and different weights are set for each classification. Here, the items related to processes during image formation means items that depend on the functions executed only by the image forming apparatus MFP, such as "Nin1" (reduced printing) function that can be realized only during the process of printing on the paper medium. The items related to processes during image formation include "double-sided printing", "sort" and the like (group 560 of FIG. 15). The items related to processes after image formation means items that can be executed by an apparatus other than the image forming apparatus MFP or by the user, such as "staple" and "punch" that can be performed on the paper medium after printing (group 562 of FIG. 15). It is preferred that the weight coefficients are made different relative to the operations of the corresponding setting items as described above.

In weight coefficient storage unit 508 shown in FIG. 15, weight coefficients of items related to the processes during image formation are set relatively larger than the weight coefficients of items related to processes after image formation. It is noted that, contrary to the example shown in FIG. 15, weight coefficients of items related to the processes during image formation may be set relatively smaller than the weight coefficients of items related to processes after image formation.

Next, the compatibility calculating process at compatibility calculating unit 504 will be described with reference to FIGS. 13 to 16.

First, receiving the setting information of each print data from print list receiving unit 502, compatibility calculating unit 504 extracts setting items included in the setting information. Then, compatibility calculating unit 504 makes a list of setting items extracted from the setting information in setting item field 532.

Next, for each item listed in setting item field 532, compatibility calculating unit 504 determines whether it is executable or not by making reference to the device information stored in device information storage unit 506, and sets the result of determination in executability field 534 In the example shown in FIG. 14, the corresponding image forming apparatus does not support the "staple" function and the "punch" function, and therefore in the example shown in FIG. 16, "staple" and "punch" are both set to "unexecutable" ("0"), while other setting items are set to "executable" ("1").

Further, compatibility calculating unit 504 sets weight coefficient (weight coefficient field 536) on each item listed in setting item field 532, with reference to the weight coefficients stored in weight coefficient storage unit 508. Further, compatibility calculating unit 504 calculates total sum of weight coefficients set in weight coefficient field 536. In the example shown in FIG. 16, the sum of weight coefficients is "38".

Further, compatibility calculating unit 504 successively calculates a product of the value in executability field 534 and the corresponding value in the weight coefficient field 536, and sets the result of calculation in satisfaction level field 538. Here, the value of executability field 534 for the unexecutable setting item is "0" and, therefore, the satisfaction level of the setting item becomes "0". Then, compatibility calculating unit 504 calculates the sum of satisfaction levels set in satisfaction level field 538. In the example shown in FIG. 16, the sum of satisfaction level is "34".

Here, the sum of satisfaction level indicates the degree of satisfaction with respect to the setting information included in certain print data. The maximum value of the degree of satisfaction varies dependent on the number of setting items included in the setting information, and therefore, normalization is necessary. Therefore, compatibility calculating unit 504 divides the sum of satisfaction level set in satisfaction level field 538 ("34" in the example shown in FIG. 16) by the sum of weight coefficient set in weight coefficient field 536 ("38" in the example shown in FIG. 16), and outputs the result of division as the compatibility. In the example shown in FIG. 16, the compatibility is "89%".

By the above-described process, compatibility calculating unit 504 calculates the compatibility for the setting information of each print data.

Again referring to FIG. 13, print list receiving unit 520 obtains the compatibility calculated by compatibility calculating unit 504 in the above-described manner, and has the received print list and the compatibility corresponding to each print data displayed on display 138.

Figure 17:
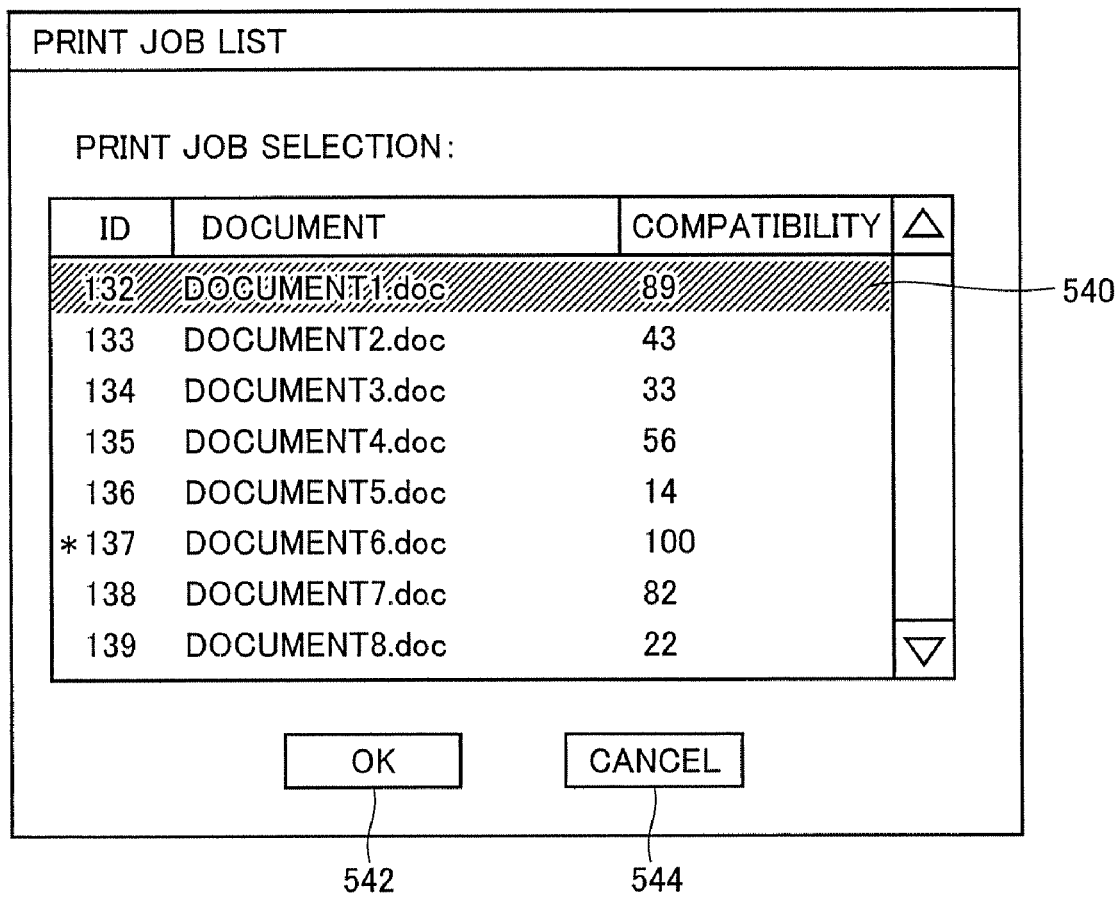
FIG. 17 shows an exemplary display of a print list in the image forming apparatus in accordance with Embodiment 1 of the present invention.

FIG. 17 shows an exemplary display of the print list in the image forming apparatus MFP in accordance with Embodiment 1 of the present invention.

Referring to FIG. 17, print list receiving unit 502 (FIG. 13) has the print data stored in server SRV displayed as a list on display unit 138, and urges the user to select the print data. Specifically, display unit 138 displays the document name of each print data and the corresponding compatibility in the order of job ID, and displays a selection cursor 540 to allow the user to select print data as the object of printing. Then, the user selects the desired print data by operating the selection cursor 540 and then selects "OK" button 542, whereby selection of print data is finished. If "CANCEL" button 544 is selected, the pull print process is canceled, and subsequent printing process is not executed.

It is noted that print list receiving unit 502 displays the print data of which requests of setting information are fully satisfied (in the example shown in FIG. 17, "document 6.doc") in a manner different from other print data included in the print list. As an example of different manner of display, "*" is added to "document 6.doc" of which compatibility is 100%, in FIG. 17. In place of or in addition to this approach of adding a special mark, the font type or font color may be made different.

Again referring to FIG. 13, print data request unit 510 transmits, in accordance with the operation of touch panel 136 by the user as shown in FIG. 17, a print data request for specifying the selected print data to server SRV. By way of example, the value of "job ID" is used for specifying the print data.

Receiving the print data from server SRV, print data receiving unit 512 has a screen image urging change in setting information of the received print data displayed on display unit 138. Specifically, if the requests of the received print data cannot fully be satisfied (or if the compatibility is not 100%), it may be preferable to loosen limitation of the setting items of the print data. Therefore, before the process of printing the print data received from sever apparatus SRV, print data receiving unit 512 displays the print setting image such as shown in FIG. 7 above.

When the setting information of the object print data is changed by the user operation on the print setting image as such, print data receiving unit 512 outputs the print data reflecting the change to printer controller 118. If the compatibility for the received print data is 100%, the print data as received may directly be output to printer controller 118 without displaying the print setting image.

Printer controller 118 and printing unit 116 execute the printing process based on the print data from print data receiving unit 512. Then, paper medium having the print data desired by the user printed thereon is output from the image forming apparatus MFP.

As to the correspondence between various functional blocks shown in FIG. 13 and the present invention, print list requesting unit 500 corresponds to the "list requesting unit", compatibility calculating unit 540 corresponds to the "compatibility calculating unit", display unit 138 corresponds to the "display unit", print data requesting unit 510 corresponds to the "data requesting unit", and printing unit 16 corresponds to the "processing unit."

Figure 18:
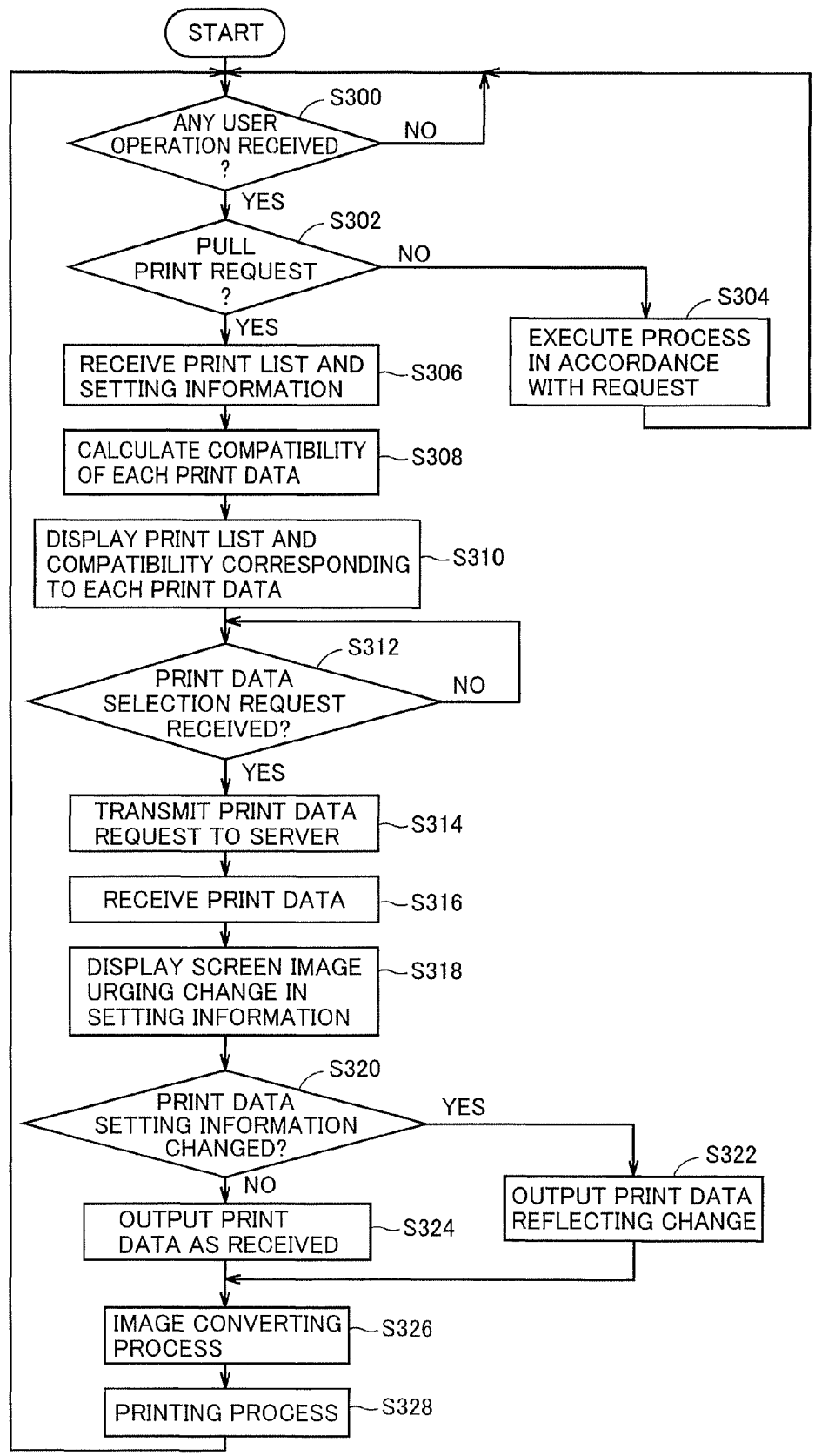
FIG. 18 is a flowchart representing process procedure in the image forming apparatus in accordance with Embodiment 1 of the present invention.

FIG. 18 shows process procedure in the image forming apparatus MFP in accordance with Embodiment 1 of the present invention.

Referring to FIGS. 13 and 18, first, CPU 100 determines whether any user operation is received through touch panel 136 or not (step S300). If no user operation has been received (NO at step S300), CPU 100 waits until any user operation is received (step S300).

If any user operation is received (YES at step S300), CPU 100 determines whether the received user operation is a pull print request or not (step S302). If the received user operation is not the pull print request (NO at step S302), CPU executes a process corresponding to the request (step S304). Then, the process returns to step S300.

If the received user operation is a pull print request (YES at step S302), CPU 100 functioning as print list requesting unit 500 transmits the print list request to server SRV (step S304). Thereafter, CPU 100 functioning as print list receiving unit 502 waits until the print list and the setting information are received from server SRV (step S306). Receiving the print list and the setting information from server SRV, CPU 100 functioning as compatibility calculating unit 504 calculates compatibility of each print data, based on the setting information from print list receiving unit 502 and the device information stored in advance in device information storage unit 506 (step S308). Then, CPU 100 functioning as print list receiving unit 502 has the received print list and the compatibility corresponding to each print data displayed on display unit 138 (step S310).

Thereafter, CPU 100 functioning as print data requesting unit 510 determines whether any request for selecting print data from the user through touch panel 136 has been received or not (step S312). If no request has been received (NO at step S312), CPU 100 waits until a print data selection request is received (step S312).

When a print data selection request from the user is received (YES at step S312), CPU 100 transmits, in response to the selection request, a print data request for specifying the selected print data to server SRV (step S314). Then, CPU 100 functioning as print data receiving unit 512 waits until the print data is received from server SRV (step S316).

Receiving the print data from server SRV, CPU 100 functioning as print data receiving unit 512 has a screen image urging change in setting information on the received print data displayed on display unit 138 (step S318). Then, CPU 100 functioning as print data receiving unit 512 determines whether the setting information of the object print data has been changed by a user operation or not (step S320). If the setting information of the object print data has been changed (YES at step S320), CPU 100 functioning as print data receiving unit 512 outputs the print data reflecting the change to printer controller 118 (step S322). If the setting information of the object print data is not changed (NO at step S320), CPU 100 functioning as data receiving unit 512 outputs the print data as received from server SRV to printer controller 118 (step S324).

Printer controller 118 performs a prescribed image converting process based on the print data from CPU 100, and outputs the processed data (e.g. raster data) to printing unit 116 (step S326). Then, based on the raster data from printer controller 118, printing unit 116 prints the image on paper medium and outputs the result (step S328). Then, the process returns to step S300.

According to Embodiment 1 of the present invention, the server SRV transmits the print data list and the setting information included in the print data to image forming apparatus MFP, in response to the print list request from the image forming apparatus MFP. Then, based on predetermined device information, the image forming apparatus MFP calculates compatibility of the setting information with the request, and displays to the user the calculated compatibility together with the print data list. Therefore, it is possible for the user to select the print data as the object of image formation with reference to the compatibility in the image forming apparatus MFP of interest.

As a result, it becomes possible for the user to know beforehand to which extent the request set at the time of generating the print data can be satisfied by the image forming apparatus by which the print data is to be printed. Thus, the user can appropriately select the print data to be output and the image forming apparatus MFP to be used.

Embodiment 2

In Embodiment 1 above, a configuration in which the compatibility for the print data is calculated by each image forming apparatus has been described as an example. In the present embodiment, a configuration will be described in which compatibility of every image forming apparatus is calculated by the server.

The overall configuration of the image forming system in accordance with the present embodiment is similar to that of FIG. 1 described above and, therefore, detailed description will not be repeated. Further, hardware configurations of the personal computers, server and image forming apparatuses forming the image forming system are also the same as those of FIGS. 2 and 3 above and, therefore, detailed description will not be repeated.

(Overall Process Sequence of Image Forming System)

First, referring to FIG. 19, the overall process in the image forming system in accordance with the present embodiment will be described.

Figure 19:
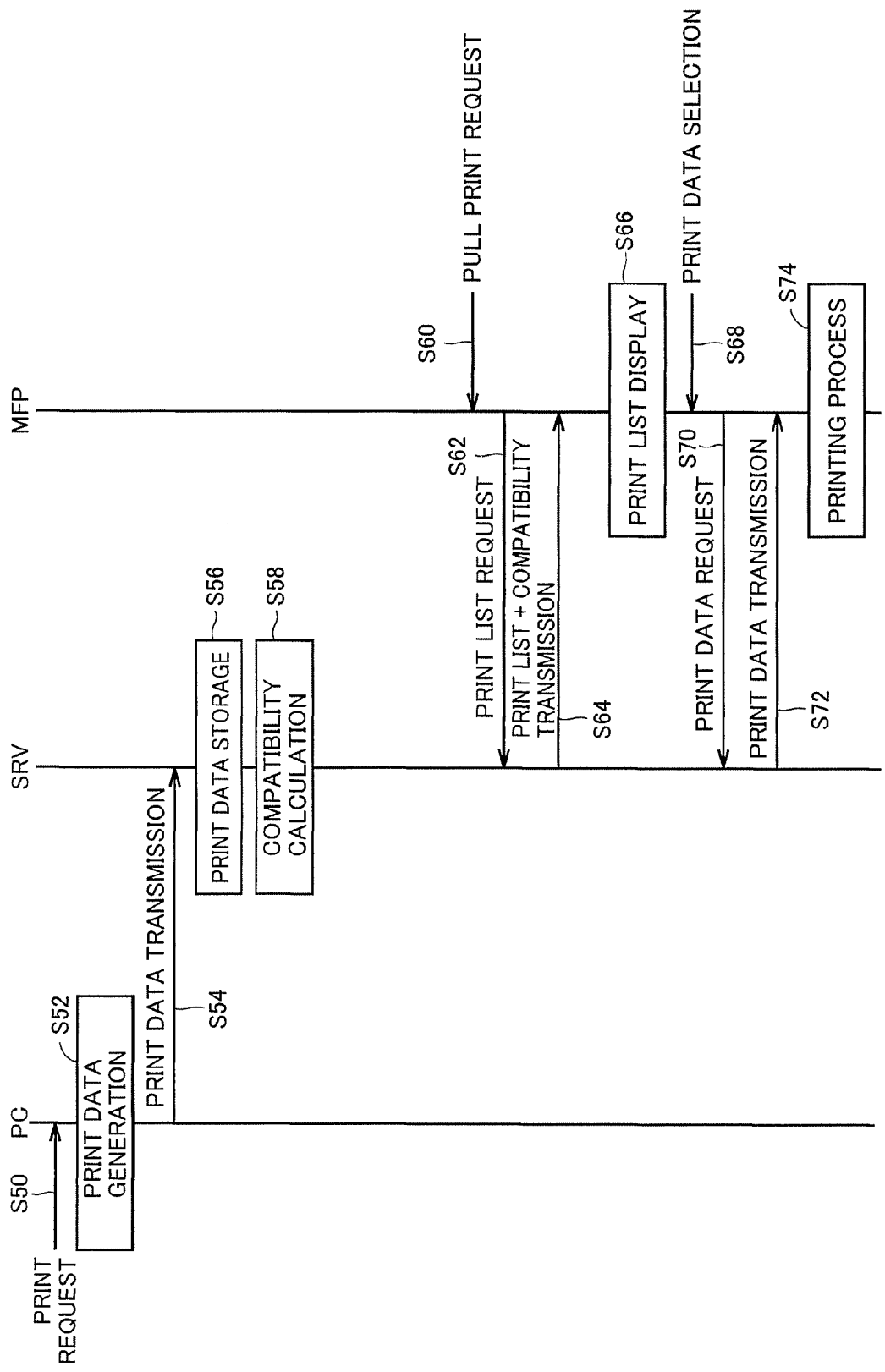
FIG. 19 is a sequence diagram representing the overall process procedure in the image forming system in accordance with Embodiment 2 of the present invention.

Referring to FIG. 19, to an application program executed on personal computer PC, the user applies a print request by an operation of a mouse or the like (step S50), and then, personal computer PC generates print data in accordance with the application program (step S52). Personal computer PC transmits the generated print data to server SRV (step S54). Then, server SRV stores the print data from personal computer PC in hard disk unit 210 (FIG. 3) (step S56). Then, server SRV calculates compatibility with respect to the print data of each image forming apparatus MFP (step S58), and stores the calculated compatibility and the corresponding print data in hard disk unit 210 (FIG. 3).

Next, the user operates operation panel unit 114 (FIG. 2) of image forming apparatus MFP and applies a pull print request (STE S60), and then image forming apparatus MFP transmits a print list request to server SRV (step S62). In response to the print list request, server SRV transmits the list of stored print list and compatibility of each image forming apparatus MFP corresponding to each print data to the relevant image forming apparatus MFP (step S64).

Image forming apparatus MFP displays the print list from server SRV and the representative value of compatibilities of respective image forming apparatuses MFP corresponding to the print data in the list on display unit 138 (FIG. 2) (step S66).

The user selects desired print data, with reference to the print list and the corresponding representative value of compatibility displayed on display unit 138 (step S68). In response to the user's selection of the print data, image forming apparatus MFP transmits a print data request for specifying the selected print data, to server SRV (step S70). In response to the print data request, server SRV transmits the specific print data among the stored print data to image forming apparatus MFP (step S72). Based on the print data from server SRV, image forming apparatus MFP executes the printing process (step S74). Through the above-described process procedure, the pull print process is finished.

In the following, the functional configuration and process procedure of each apparatus will be described in detail.

(Functional Configuration and Process Procedure of Personal Computer)

The functional configuration and process procedure of the personal computer PC in accordance with the present embodiment are the same as the contents described with reference to FIGS. 5 and 6 and, therefore, detailed description will not be repeated.

(Functional Configuration and Process Procedure of Server)

Figure 20:
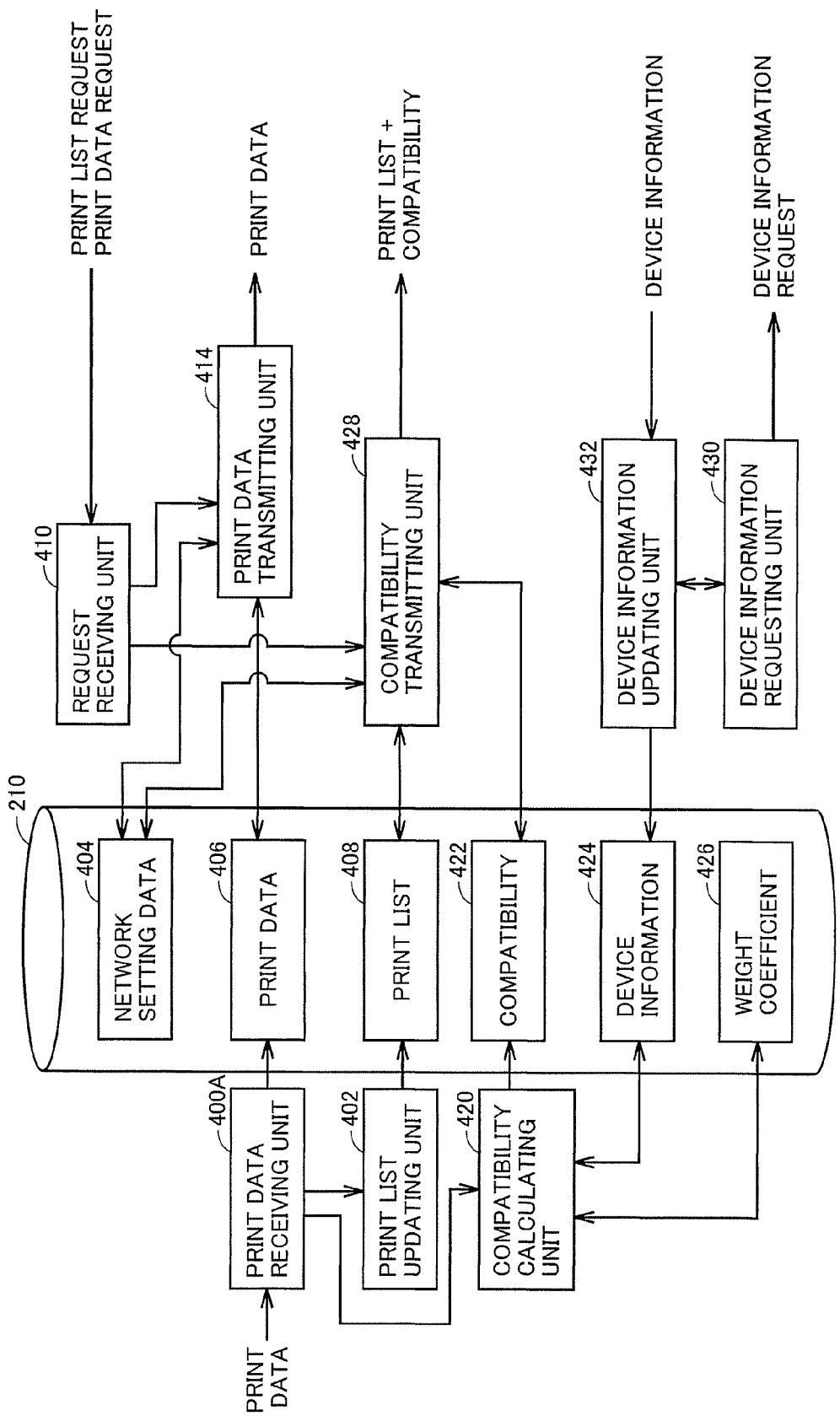
FIG. 20 is a block diagram showing a functional configuration of the server in accordance with Embodiment 2 of the present invention.

Referring to FIG. 20, server SRV in accordance with Embodiment 2 of the present invention includes a print data receiving unit 400A, a print list updating unit 402, a compatibility calculating unit 420, a network setting data storage unit 404, a print data storage unit 406, a print list storage unit 408, a compatibility storage unit 422, a device information storage unit 424, a weight coefficient storage unit 426, a request receiving unit 410, a compatibility transmitting unit 428, a print data transmitting unit 414, a device information requesting unit 430, and a device information updating unit 432, as its functions. Print data receiving unit 400A, print list updating unit 402, compatibility calculating unit 420, request receiving unit 410, compatibility transmitting unit 428, print data transmitting unit 414, device information requesting unit 430 and device information updating unit 432 are realized by CPU 200 reading a program stored in advance in hard disk unit 210 or the like to memory unit 212 and executing the program. Further, network setting data storage unit 404, print data storage unit 406, print list storage unit 408, compatibility storage unit 422, device information storage unit 424 and weight coefficient storage unit 426 are formed in a prescribed area of hard disk unit 210.

Print data receiving unit 400A receives print data from personal computer PC, and stores the received print data to print data storage unit 406. Further, print data receiving unit 400A outputs information including document name, transmission source, data size and the like of the received print data to print list updating unit 402, and extracts the setting information of the print data and output to compatibility calculating unit 420.

Print list updating unit 402, print list storage unit 408 and network setting data storage unit 404 are the same as the corresponding functional configurations of the server SRV in accordance with Embodiment 1 above and, therefore, detailed description will not be repeated.

Compatibility calculating unit 420 calculates compatibility of image forming apparatus MFP based on the setting information from print data receiving unit 400A and the device information of each image forming apparatus MFP stored in advance in device information storage unit 424. More specifically, compatibility calculating unit 420 extracts, from the functions necessary to execute the process designated in the setting information, those functions that are supported by each image forming apparatus MFP, reads the weight coefficients corresponding to the extracted functions from weight coefficient storage unit 426, and thereby calculates the compatibility.

FIG. 21 shows an example of data structure stored in device information storage unit 424 of the server SRV in accordance with Embodiment 2 of the present invention.

Referring to FIG. 21, by way of example, device information storage unit 424 stores, in the form of a list, the state of functions supported by each of the image forming apparatuses MFP that are capable of data communication with server SRV. Specifically, device information storage unit 424 stores, in correspondence to each of a plurality of functions that can be implemented in the image forming apparatus MFP, the value "Y" indicating that the function is supported or the value "N" indicating that the function is not supported, separately for each image forming apparatus MFP.

Data structure in weight coefficient storage unit 426 is the same as the data structure (FIG. 15) of weight coefficient storage unit 508 of the image forming apparatus MFP in accordance with Embodiment 1 described above, and therefore, detailed description will not be repeated.

Again referring to FIG. 20, compatibility calculating unit 420 successively calculates compatibility of each image forming apparatus MFP with respect to the print data received from personal computer PC, in accordance with the process similar to that performed by compatibility calculating unit 504 of the image forming apparatus MFP in accordance with Embodiment 1 described above. The process for calculating the compatibility is the same as that of FIG. 16 above and, therefore, detailed description will not be repeated. Then, compatibility calculating unit 420 stores the compatibility of each image forming apparatus MFP calculated successively in compatibility storage unit 422.

FIG. 22 shows an example of data structure stored in compatibility storage unit 422 of the server SRV in accordance with Embodiment 2 of the present invention.

Referring to FIG. 22, compatibility calculating unit 420 successively calculates compatibility of the image forming apparatus MFP capable of data communication with respect to one print file, and stores each calculated compatibility successively in compatibility storage unit 422 in correspondence with the job ID (identification number) of the object print file and the document name (file name) thereof. Therefore, it follows that in compatibility storage unit 422, compatibility values same in member as the image forming apparatuses MFP are stored for one same pint file (job ID).

Again referring to FIG. 20, when a print list request is received from any of the image forming apparatuses MFP, request receiving unit 410 outputs the print list request to compatibility transmitting unit 428, and when a print data request is received from any of the image forming apparatuses MFP, it outputs the print data request to print data transmitting unit 414.

In response to the print list request from request receiving unit 410, compatibility transmitting unit 428 reads the print list from print list storage unit 408, and reads the compatibility of each image forming apparatus MFP with respect to each print data stored in compatibility storage unit 422. Then, compatibility calculating unit 428 transmits the compatibility of each image forming apparatus MFP corresponding to each print data together with the read print list, to the image forming apparatus MFP as the source that has transmitted the request. Print data transmitting unit 414 is the same as the corresponding functional configuration in the server SRV in accordance with Embodiment 1 above and, therefore, detailed description will not be repeated.

In this manner, compatibility of each image forming apparatus MFP calculated in advance in server SRV is transmitted to the image forming apparatus MFP.

The contents of device information of each image forming apparatus MFP stored in advance in device information storage unit 424 may be manually updated, for example, when an image forming apparatus MFP is newly connected to the network As regards the server SRV and the image forming apparatuses MFP in accordance with the present embodiment, by way of example, a configuration is adopted in which the server asks each image forming apparatus MFP for the device information. Specifically, device information requesting unit 430 and device information updating unit 432 realize these functions. Device information requesting unit 430 transmits a device information request to each image forming apparatus MFP at every prescribed interval or at a timing of occurrence of some event. Broadcast transmission of the device information request is preferable. Device information updating unit 432 receives the device information transmitted from each image forming apparatus MFP in response to the device information request from device information requesting unit 430, and successively updates the contents of information storage unit 424 based on the received device information, as will be described later.

As to the correspondence between various functional blocks shown in FIG. 20 and the present invention, print data storage unit 406 corresponds to the "data storage unit", device information storage unit 424 corresponds to the "device information storage unit", compatibility calculating unit 420 corresponds to the "compatibility calculating unit", compatibility transmitting unit 428 corresponds to the "compatibility transmitting unit", and print data transmitting unit 414 corresponds to the "print data transmitting unit."

Figure 23:
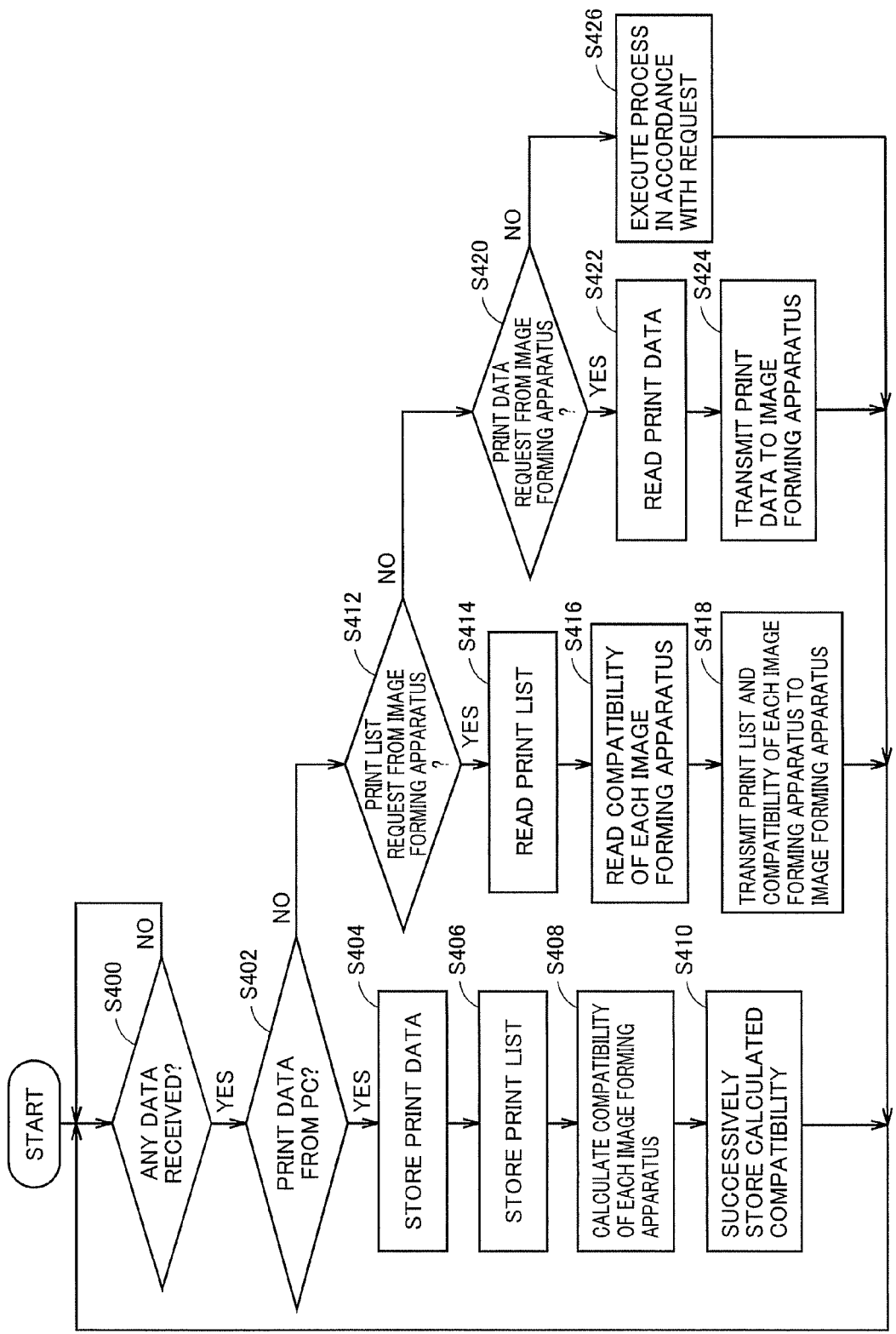
FIG. 23 is a flowchart representing process procedure in the server in accordance with Embodiment 2 of the present invention.

FIG. 23 shows process procedure of the server SRV in accordance with Embodiment 2 of the present invention.

Referring to FIGS. 20 and 23, first, CPU 200 functioning as print data receiving unit 400A and request receiving unit 410 determines whether any data is received through network interface unit 206 or not (step S400). If no data has been received (NO at step S400), CPU 200 waits until any data is received (step S400).

If any data is received (YES at step S400), CPU 200 determines whether the received data is print data from personal computer PC or not (step S402). If the received data is print data from personal computer PC (YES at step S402), CPU 200 functioning as print data receiving unit 400A stores the received print data in print data storage unit 406 in hard disk unit 210 (step S404). Thereafter, CPU 200 functioning as print list updating unit 402 newly generates or updates the print list, and stores the generated or updated print list in print list storage unit 408 (step S406). Further, CPU 200 functioning as compatibility calculating unit 420 calculates compatibility of each image forming apparatus MFP based on the setting information from print data receiving unit 400A and the device information of each image forming apparatus MFP stored in advance in device information storage unit 424 (step S408). Then, CPU 200 functioning as compatibility calculating unit 420 successively stores each calculated compatibility in compatibility storage unit 422 in correspondence with the job ID of the print file as the object and its document name (step S410). Then, the process returns to step S400.

If the received data is not the print data from personal computer PC (NO at step S402), CPU 200 determines whether the received data is a print list request from image forming apparatus MFP or not (step S412). If the received data is a print list request from the image forming apparatus MFP (YES at step S412), CPU 200 functioning as compatibility transmitting unit 428 reads the print list from print list storage unit 408 in hard disk unit 210 (step S414) and reads compatibility of each image forming apparatus MFP for each print data stored in compatibility storage unit 422 in hard disk unit 210 (step S416). Then, CPU 200 functioning as compatibility transmitting unit 428 transmits the compatibility of each image forming apparatus MFP corresponding to each print data, together with the read print list, to the image forming apparatus as the source that transmitted the request (step S418). Then, the process returns to step S400.

If the received data is not the print list request from personal computer PC (NO at step S412), CPU 200 determines whether the received data is a print data request from image forming apparatus MFP or not (step S420). If the received data is the print data request from image forming apparatus MFP (YES at step S420), CPU 200 functioning as print data transmitting unit 414 reads the print data specified by the print data request from print data storage unit 406 in hard disk unit 210 (step S422). Then, PC 200 functioning as print data transmitting unit 414 transmits the read print data to the image forming apparatus as the source of request transmission (step S424). Then, the process returns to step S400.

If the received data is not the print data request from image forming apparatus MFP (NO at step S420), CPU 200 executes a process corresponding to the received data (step S426). Then, the process returns to step S400.

(Functional Configuration and Process Procedure of Image Forming Apparatus)

Figure 24:
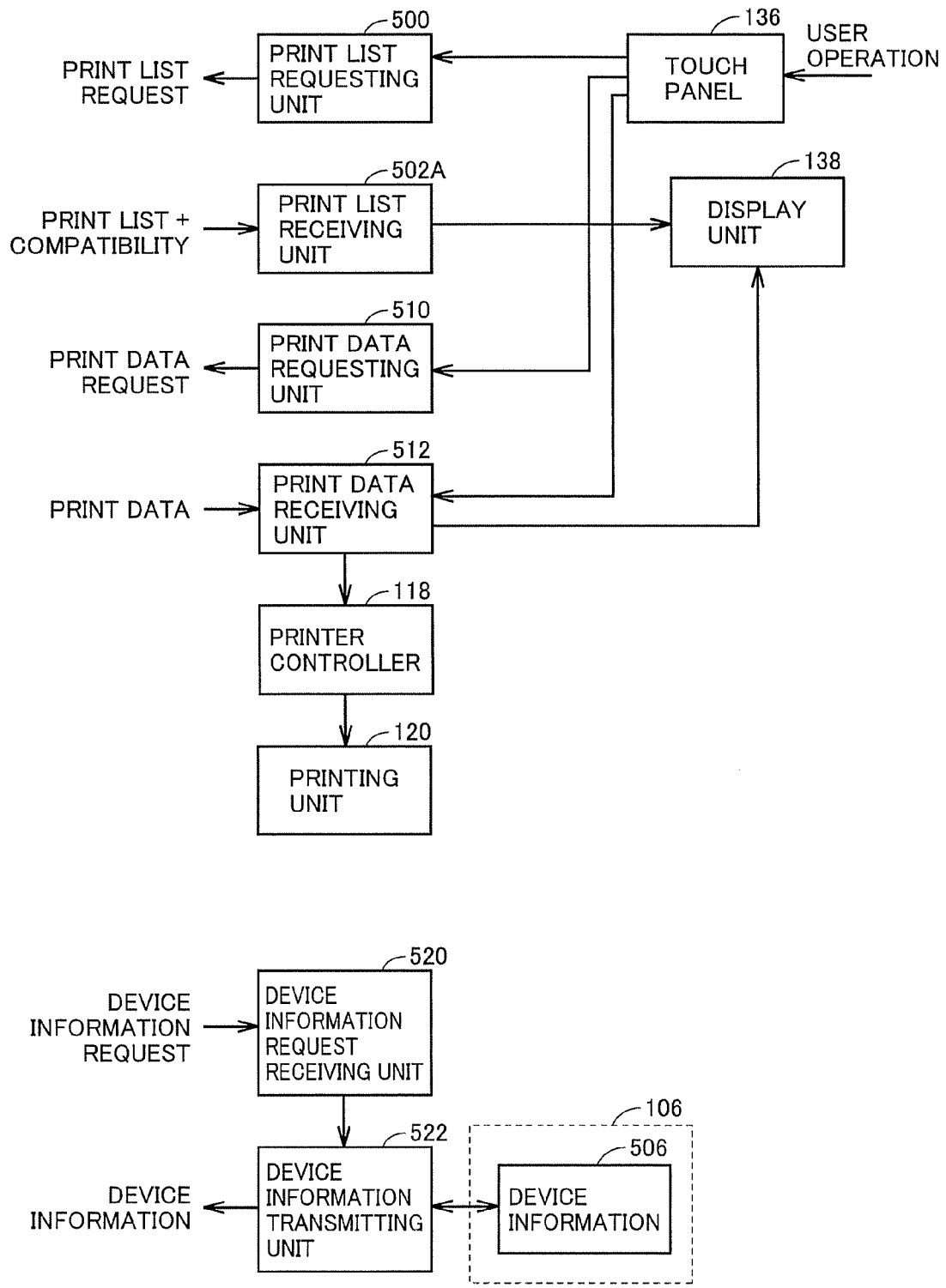
FIG. 24 is a block diagram showing a functional configuration of the image forming apparatus in accordance with Embodiment 2 of the present invention.

Referring to FIG. 24, image forming apparatus MFP in accordance with Embodiment 2 of the present invention includes a print list requesting unit 500, a print list receiving unit 502A, a print data requesting unit 510, a print data receiving unit 512, a device information request receiving unit 520, a device information transmitting unit 522, and device information storage unit 506, as its functions. These units except for device information storage unit 506 are realized by CPU 100 reading a program stored in advance in ROM 102 or the like to S-RAM 104 and executing the program. Further, device information storage unit 506 is formed in a prescribed area of NV-RAM 106.

Print list requesting unit 500 transmits the print list request to server SRV in accordance with an operation of touch panel 136 by the user.

Print list receiving unit 502A receives the print list and the compatibility of each image forming apparatus MFP from server SRV, and has the received print list and representative value of the compatibility of each image forming apparatus corresponding to each print data displayed on display unit 138. As an example of the representative value, print list receiving unit 502A has the compatibility of that image forming apparatus MFP which received the print list displayed on display unit 138. Further, print list receiving unit 502A is also capable of displaying the compatibilities of respective image forming apparatuses in the form of a list, for the selected print data, in accordance with a user operation.

Figure 25:
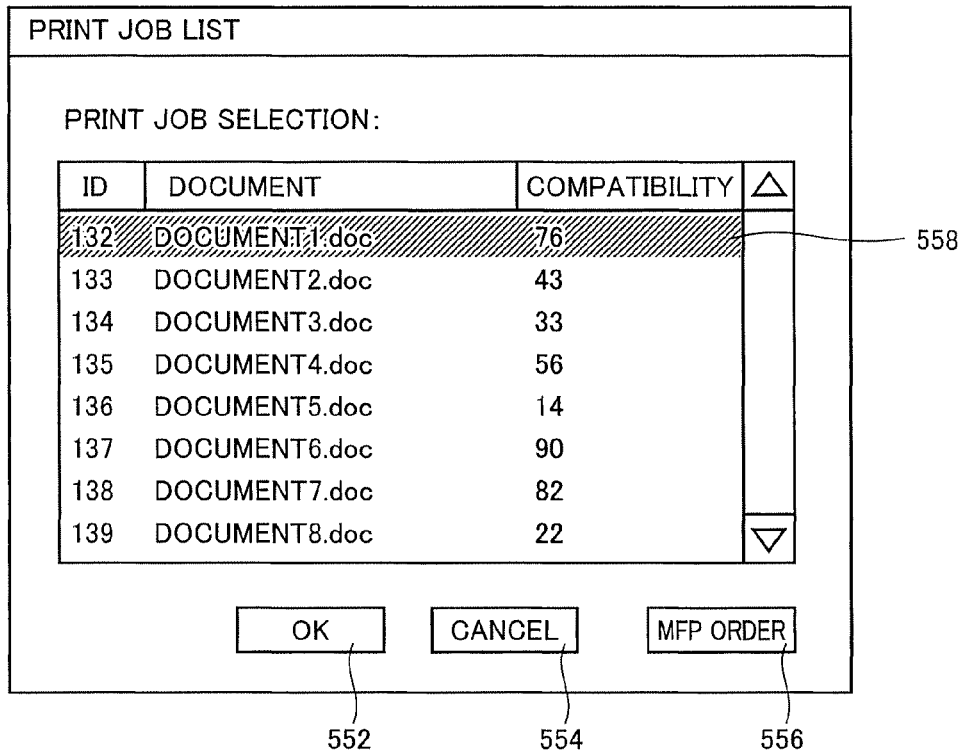
FIG. 25 shows an exemplary display of a print list in the image forming apparatus in accordance with Embodiment 2 of the present invention.

FIG. 25 shows an exemplary display of the print list in the image forming apparatus MFP in accordance with Embodiment 2 of the present invention.

Figure 26:
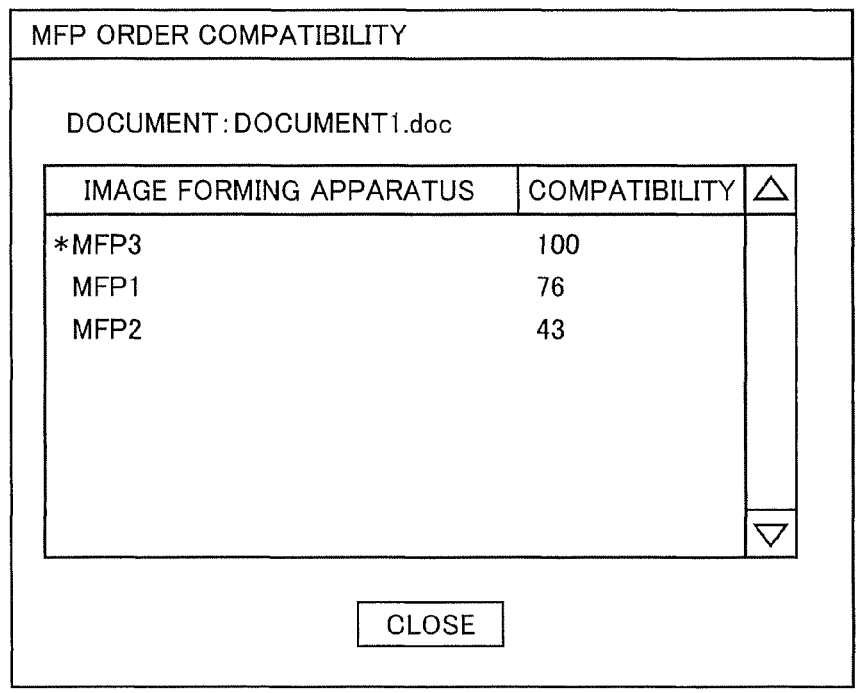
FIG. 26 shows an exemplary display when compatibility of each image forming apparatus is to be displayed in a list.

FIG. 26 shows an exemplary display when the compatibilities of respective image forming apparatuses are displayed in the form of a list, in the image forming apparatus MFP in accordance with Embodiment 2 of the present invention.

Referring to FIG. 25, print list receiving unit 502A (FIG. 24) has the print data stored in server SRV displayed in the form of a list on display unit 138, and urges the user to select print data. Specifically, on display unit 138, document name of each print data and representative value of corresponding compatibility (e.g. compatibility of the subject image forming apparatus) are displayed in the order of job ID, and a selection cursor 558 allowing the user to select the print data as the object of printing is displayed. When the user selects a desired print data by operating selection cursor 558 and then selects "OK" button 552, selection of print data is finished. If "CANCEL" button 554 is selected, the pull print process is cancelled, and subsequent printing process is not executed.

When the user selects an "MFP order" button 556 here, print list receiving unit 502A displays compatibilities of respective image forming apparatuses MFP in the form of a list, as shown in FIG. 26, for the print data selected by selection cursor 558.

Referring to FIG. 26, print list receiving unit 502A displays, in the form of a list, compatibilities of respective image forming apparatuses MFP for a specific print data (in the example of FIG. 26, "document 1 doc"). Here, display from higher compatibility is preferred. Further, print list receiving unit 502A displays the image forming apparatus MFP that can fully satisfy the requests of setting information included in the print data (in the example shown in FIG. 26, "MFP 3") in a manner different from other image forming apparatuses. As an example of different manner of display, "*" is added to "MFP3" of which compatibility is 100%, in FIG. 26. In place of or in addition to this approach of adding a special mark, the font type or font color may be made different.

Again referring to FIG. 24, print data requesting unit 510 and print data receiving unit 512 are the same as the corresponding functional configurations in the image forming apparatus MFP in accordance with Embodiment 1 and, therefore, detailed description will not be repeated.

Device information request receiving unit 520 and device information transmitting unit 522 are functional configurations for successively updating the contents of device information storage unit 424 (FIG. 20) of server SRV. Specifically, device information request receiving unit 520 receives a device information request from the server SRV, and outputs the received device information request to device information transmitting unit 522. Device information transmitting unit 522 reads device information stored in advance in device information storage unit 506, and transmits the read device information to server SRV.

As to the correspondence between various functional blocks shown in FIG. 24 and the present invention, print list requesting unit 500 corresponds to the "list requesting unit", display unit 138 corresponds to the "display unit", print data requesting unit 510 corresponds to the "data requesting unit" and printing unit 116 corresponds to the "processing unit."

Figure 27:
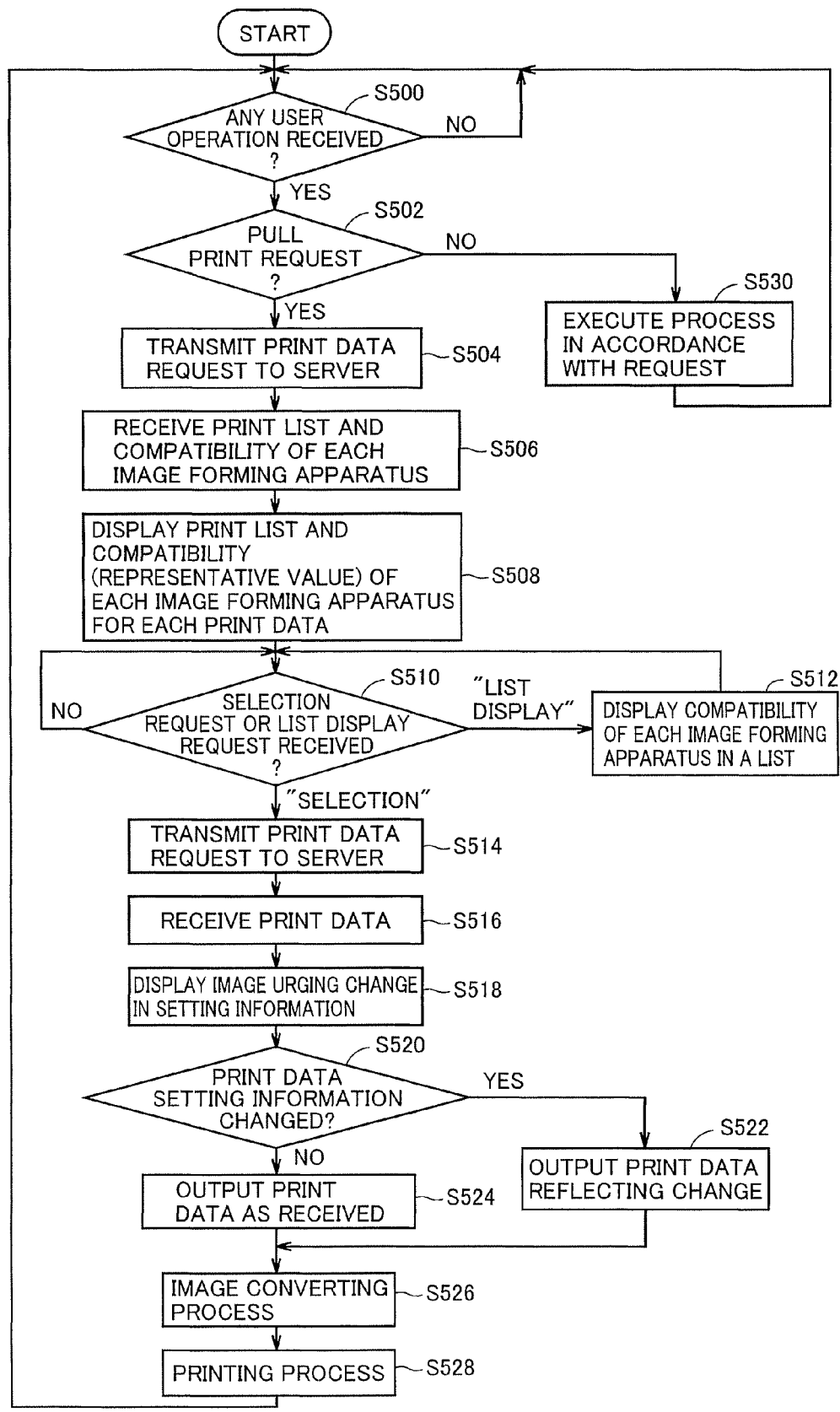
FIG. 27 is a flowchart representing process procedure in the image forming apparatus in accordance with Embodiment 2 of the present invention.

FIG. 27 shows process procedure in the image forming apparatus MFP in accordance with Embodiment 2 of the present invention.

Referring to FIGS. 24 and 27, first, CPU 100 determines whether any user operation through touch panel 136 has been received or not (step S500). If no user operation has been received (NO at step S500), CPU 100 waits until any user operation is received (step S500).

If any user operation is received (YES at step S500), CPU 100 determines whether the received user operation is a pull print request or not (step S502). If the received user operation is not the pull print request (NO at step S502), CPU 100 executes a process in accordance with the request (step S530). Then, the process returns to step S500.

If the received user operation is a pull print request (YES at step S502), CPU 100 functioning as print list requesting unit 500 transmits a print list request to server SRV (step S504). Thereafter, CPU 100 functioning as print list receiving unit 502A waits until the print list and the compatibility of each image forming apparatus MFP are received from server SRV (step S506). Receiving the print list and the compatibility of each image forming apparatus MFP from server SRV, CPU 100 functioning as print list receiving unit 502A has the received print list and the representative value of compatibilities of respective image forming apparatuses MFP corresponding to each print data displayed on display unit 138 (step S508). Further, CPU 100 determines whether a print data selection request or a list display request from the user through touch panel 136 has been received or not (step S510). If neither of the requests has been received (NO at step S510), CPU 100 waits until any request is received (step S510).

If a list display request from the user is received ("List Display" at step S510), CPU 100 functioning as print list receiving unit 502A displays, in the form of a list, compatibilities of respective image forming apparatuses MFP for the selected print data (step S512). Then, the process returns to step S510.

If a selection request from the user is received ("Selection" at step S510), CPU 100 functioning as print data requesting unit 510 transmits a print data request for specifying the selected print data to server SRV (step S514). Thereafter, CPU 100 functioning as print data receiving unit 512 waits until the print data is received from server SRV (step S516).

Receiving the print data from server SRV, CPU 100 functioning as print data receiving unit 512 has an image urging change in setting information with respect to the received print data displayed on display unit 138 (step S518). Then, CPU 100 functioning as print data receiving unit 512 determines whether the setting information of the object print data is changed by a user operation or not (step S520). If the setting information of the object print data is changed (YES at step S520), CPU 100 functioning as print data receiving unit 512 outputs the print data reflecting the change to printer controller 118 (step S522). If the setting information of the object print data is not changed (NO at step S520), CPU 100 functioning as print data receiving unit 512 outputs the print data as received from server SRV to printer controller 118 (step S524).

Based on the print data from CPU 100, printer controller 118 performs a prescribed image converting process, and outputs the processed data (e g. raster data) to printing unit 116 (step S526). Based on the raster data from printer controller 118, printing unit 116 prints an image on paper medium and outputs the result (step S528). Then, the process returns to step S500.

According to Embodiment 2 of the present invention, receiving print data from personal computer PC, server SRV calculates compatibility of each image forming apparatus MFP with respect to the requests of setting information of the received print data, based on the device information of each image forming apparatus MFP stored in advance. Then, in response to the print list request from image forming apparatus MFP, server SRV transmits the print data list together with the compatibility of each image forming apparatus MFP with respect to the print data, and the image forming apparatus displays these pieces of information to the user. Therefore, it becomes possible for the user to know beforehand to which extent the request set at the time of generating the print data can be satisfied by the image forming apparatus by which the print data is to be printed, and to compare the compatibility with respect to the print data with the compatibility of other image forming apparatus MFP. Thus, it is possible for the user to more appropriately select the print data to be output and the image forming apparatus MFP to be used.

Other Embodiments

The program in accordance with the present invention may be realized by calling necessary modules in a prescribed sequence at prescribed timings to execute processes, from program modules provided as part of the operating system (OS) of a computer. In such a case, the program itself does not include the modules mentioned above, and the processes are executed in cooperation with the OS. Such program not including the modules is also encompassed by the present invention.

Further, the program in accordance with the present invention may be provided incorporated as a part of another program. In that case also, the program itself does not include the modules included in said another program, and the processes are executed in cooperation with said another program Such a program incorporated in another program is also encompassed by the present invention.

The program product provided by the invention is executed installed in a program storage such as a hard disk. The program product includes the program itself and a storage medium storing the program.

Further, part of or all of the functions realized by the program in accordance with the present invention may be implemented by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming system, comprising:
   at least one information processing apparatus capable of transmitting print data including print setting information selected by a user related to image formation,
   a server receiving said print data from said information processing apparatus; and a plurality of image forming apparatuses capable of data communication with said server; wherein said server includes a data storage unit storing said print data received from said information processing apparatus, a setting information transmitting unit responsive to a list request from an image forming apparatus from the plurality of image forming apparatuses, for transmitting a list of said print data stored in said data storage unit and said user selected print setting information included in said print data to the image forming apparatus, and a print data transmitting unit responsive to a data request from said image forming apparatus, for transmitting a specific print data stored in said data storage unit to the image forming apparatus; and each said image forming apparatus includes a list requesting unit transmitting said list request to said server in accordance with a user operation, a compatibility calculating unit receiving said user selected print setting information of said print data from said server and calculating, based on predetermined device information, a compatibility for each item listed in said user selected print setting information indicating a projected degree of satisfaction with respect to each of said items listed in said user selected print setting information, a display unit displaying each item listed in said user selected print setting information of said print data received from said server and said compatibility corresponding to each item in said list of said print data, a data requesting unit transmitting said data request for specifying at least one item from said user selected items listed in said print setting information of said print data to said server, in accordance with a user operation, and a processing unit for performing an image forming process based on said print data from said server.

2. The image forming system according to claim 1, wherein said image forming apparatus is configured to selectively support a plurality of functions,
said setting information includes setting of a process that depends on any of said plurality of functions;
said device information includes a state information of support of said plurality of functions in said image forming apparatus; and
said compatibility calculating unit calculates the compatibility based on the supported functions among functions necessary for executing the process designated in said setting information and on a weight corresponding to each function.

3. The image forming system according to claim 2, wherein said plurality of functions include a function related to a process during image formation and a function related to a process after image formation; and
the weight corresponding to the function related to said process during image formation is different from the weight corresponding to the function related to said process after image formation.

4. The image forming system according to claim 1, wherein said display unit displays said print data satisfying all requests in said setting information in a manner different from other print data.

5. The image forming system according to claim 1, wherein said setting information includes setting of at least one of double-sided printing, reduced printing, sort output, group output, stapling and punching.

6. An image forming system, comprising:
at least one information processing apparatus capable of transmitting print data including user selected print setting information related to image formation;
a server receiving said print data from said information processing apparatus; and
a plurality of image forming apparatuses capable of data communication with said server; wherein
said server includes
a data storage unit storing said print data received from said information processing apparatus,
a device information storage unit storing in advance device information of each image forming apparatus of said plurality of image forming apparatus,
a compatibility calculating unit for calculating, for each image forming apparatus of said plurality of image forming apparatuses, a compatibility for each item listed in said user selected print setting information indicating a degree of satisfaction with respect to each of said items listed in said user selected print setting information, based on the device information of each of said at least one image forming apparatus,
a compatibility transmitting unit responsive to a list request from said image forming apparatus, for transmitting said compatibility of each image forming apparatus of said plurality of image forming apparatuses corresponding to each item listed in said selected print setting information of said print data together with a list of said print data stored in said storage unit, to the image forming apparatus, and
a print data transmitting unit responsive to a data request from said image forming apparatus, for transmitting a specific print data stored in said storage unit to the image forming apparatus; and
each said image forming apparatus includes
a list requesting unit transmitting said list request to said server in accordance with a user operation,
a display unit displaying said list of print data from said server and a representative value of said compatibility for each item listed in said selected print setting information of said image forming apparatus corresponding to said print data,
a data requesting unit transmitting said data request for specifying at least one item from said user selected items listed in said print setting information of said print data to said server in accordance with a user operation, and
a processing unit for performing an image forming process based on said print data from said server.

7. The image forming system according to claim 6, wherein said display unit further displays said compatibility of each of said at least one image forming apparatus with respect to specific said print data.

8. The image forming system according to claim 6, wherein said image forming apparatus is configured to selectively support a plurality of functions;
said setting information includes setting of a process that depends on any of said plurality of functions;
said device information includes a state information of support of said plurality of functions in said image forming apparatus; and
said compatibility calculating unit calculates the compatibility based on the supported functions among functions necessary for executing the process designated in said setting information and on a weight corresponding to each function.

9. The image forming system according to claim 8, wherein
said plurality of functions include a function related to a process during image formation and a function related to a process after image formation; and
the weight corresponding to the function related to said process during image formation is different from the weight corresponding to the function related to said process after image formation.

10. The image forming system according to claim 6, wherein
said display unit displays said print data satisfying all requests in said setting information in a manner different from other print data.

11. The image forming system according to claim 6, wherein
said setting information includes setting of at least one of double-sided printing, reduced printing, sort output, group output, stapling and punching.

12. An image forming apparatus capable of selectively obtaining print data from a server; wherein
said server receives print data including user selected print setting information related to image formation from an information processing apparatus and stores the print data;
said image forming apparatus comprising
a list requesting unit for transmitting a list request to said server in accordance with a user operation requesting a list of said print data and said user selected print setting formation included in said print data stored in said server;
a compatibility calculating unit receiving said user selected print setting information of said print data from said server and calculating, based on predetermined device information, compatibility for each item listed in said user selected print setting information indicating a degree of satisfaction with respect to each of said items listed in said setting information,
a display unit displaying each item listed in said user selected print setting information of said print data received from said server and said compatibility corresponding to each item in said list of said print data, and
a data requesting unit transmitting said data request for specifying at least one item from said user selected items listed in said print setting information of said print data to said server, in accordance with a user operation;
said server transmits specific print data to the image forming apparatus in response to said data request, and
said image forming apparatus further comprising
a processing unit for performing an image forming process based on said print data from said server.

13. The image forming apparatus according to claim 12, wherein
said image forming apparatus is configured to selectively support a plurality of functions;
said setting information includes setting of a process that depends on any of said plurality of functions;
said device information includes a state information of support of said plurality of functions in said image forming apparatus; and
said compatibility calculating unit calculates the compatibility based on the supported functions among functions necessary for executing the process designated in said setting information and on a weight corresponding to each function.

14. An image forming method using an image forming system, wherein
said image forming system includes
at least one information processing apparatus capable of transmitting print data including user selected print setting information related to image formation,
a server receiving said print data from said information processing apparatus, and
at least one image forming apparatus capable of data communication with said server;
said image forming method comprising the steps of:
storing, in said server, said print data received from said information processing apparatus;
transmitting, from said image forming apparatus, a list request to said server in accordance with a user operation, said list request requesting a list of said print data and said user selected print setting formation included in said print data stored in said server;
transmitting, from said server, said setting information included in said print data together with a list of said print data stored therein, in response to the list request from said image forming apparatus;
receiving, in said image forming apparatus, said user selected print setting information from said server;
calculating, in said image forming apparatus, a compatibility for each item listed in said user selected print setting information to indicate a degree of satisfaction with respect to each of said items listed in said setting information;
displaying each item listed in said user selected print setting information of said print data received from said server and said compatibility corresponding to each item in said list of said print data;
transmitting, from said image forming apparatus, a data request, to said server, for specifying at least one item from said user selected items listed in said print setting information of said print data in accordance with a user operation;
receiving a specific print data, from said server, in response to a data request from said image forming apparatus; and
performing, in said image forming apparatus, an image forming process based on said print data from said server.

15. The image forming method according to claim 14, wherein
said image forming apparatus is configured to selectively support a plurality of functions;
said setting information includes setting of a process that depends on any of said plurality of functions;
said device information includes a state information of support of said plurality of functions in said image forming apparatus; and
said calculating step includes the step of calculating compatibility based on the supported functions among functions necessary for executing the process designated in said setting information and on a weight corresponding to each function.

16. An image forming method using an image forming system, wherein
said image forming system includes
at least one information processing apparatus capable of transmitting print data including user selected print setting information related to image formation,
a server receiving said print data from said information processing apparatus, and
at least one image forming apparatus capable of data communication with said server;

said server stores in advance device information of each of said at least one image forming apparatus;

said image forming method comprising the steps of:

storing, in said server, said print data transmitted from said information processing apparatus;

calculating, in said server, for each of said at least one image forming apparatus, a compatibility for each item listed in said user selected print setting information to indicate a degree of satisfaction with respect to each of said items listed in said user selected print setting information of said print data, based on the device information of each of said at least one image forming apparatus, transmitting, from said image forming apparatus, a list request to said server in accordance with a user operation;

transmitting, from said server, said compatibility of each of said at least one image forming apparatus corresponding to each item listed in said user selected print setting information of said print data together with a list of said print data stored therein to the image forming apparatus, in response to the list request received from said image forming apparatus;

displaying, at said image forming apparatus, the list of said print data received from said server and a representative value of said compatibility of each of said at least one image forming apparatuses corresponding to said print data;

transmitting, from said image forming apparatus, a data request, to said server, for specifying at least one item listed in said user selected print setting information of said print data in accordance with a user operation;

transmitting, from said server in response to the data request from said image forming apparatus, a specific print data to the image forming apparatus; and performing, by said image forming apparatus, an image forming process based on said print data from said server.

17. The image forming method according to claim 16, wherein said step of displaying includes the step of further displaying said compatibility of each of said at least one image forming apparatus, for specific said print data.

18. The image forming method according to claim 16, wherein said image forming apparatus is configured to selectively support a plurality of functions, said setting information includes setting of a process that depends on any of said plurality of functions;

said device information includes a state information of support of said plurality of functions in said image forming apparatus; and said calculating step includes the step of calculating compatibility based on the supported functions among functions necessary for executing the process designated in said setting information and on a weight corresponding to each function.

* * * * *